United States Patent
Wolff et al.

(10) Patent No.: US 12,279,745 B2
(45) Date of Patent: Apr. 22, 2025

(54) FILTERING DEVICES FOR EVACUATION STATIONS

(71) Applicant: iRobot Corporation, Bedford, MA (US)

(72) Inventors: Andrew Vincent Wolff, Norfolk, MA (US); Ryan Mercier, Boston, MA (US); Chin Xu, Shenzhen (CN); Jason Jeffrey Suchman, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 884 days.

(21) Appl. No.: 17/369,751

(22) Filed: Jul. 7, 2021

(65) Prior Publication Data

US 2023/0010550 A1    Jan. 12, 2023

(51) Int. Cl.
*A47L 9/28* (2006.01)
*A47L 9/14* (2006.01)
(Continued)

(52) U.S. Cl.
CPC .......... *A47L 9/2873* (2013.01); *A47L 9/1409* (2013.01); *A47L 9/149* (2013.01); *B01D 46/0004* (2013.01); *B01D 46/0005* (2013.01); *B01D 46/0043* (2013.01); *B01D 46/02* (2013.01); *A47L 2201/024* (2013.01);
(Continued)

(58) Field of Classification Search
CPC ...... A47L 9/149; A47L 9/1409; A47L 9/2873; A47L 2201/024; A47L 2201/04; B01D 46/0004; B01D 46/0005; B01D 46/0043; B01D 46/02; B01D 2265/028;
(Continued)

(56) References Cited

U.S. PATENT DOCUMENTS

| | | | | |
|---|---|---|---|---|
| 4,185,976 A | * | 1/1980 | Kosik | B01D 46/02 55/378 |
| 5,349,752 A | * | 9/1994 | Stirm | B08B 15/04 83/100 |

(Continued)

FOREIGN PATENT DOCUMENTS

| | | |
|---|---|---|
| EP | 2276679 | 1/2011 |
| WO | WO 2009129133 | 10/2009 |

OTHER PUBLICATIONS

International Preliminary Report on Patentability in International Appln. No. PCT/US2022/073460, mailed on Jan. 18, 2024, 12 pages.

(Continued)

*Primary Examiner* — Andrew A Horton
(74) *Attorney, Agent, or Firm* — Fish & Richardson P.C.

(57) ABSTRACT

A filtering device for an evacuation station includes a filter bag configured to collect debris evacuated from a cleaning robot by an evacuation station. The filtering device includes an interface assembly configured to interface with the evacuation station. The interface assembly includes (i) a base attached to the filter bag along an opening of the filter bag, (ii) an access door configured to provide or limit access to a space within the filter bag depending on whether the access door is in an open position or a closed position, and (iii) one or more hinges connecting the base to the access door. The access door is rotatable around the one or more hinges from the closed position to the open position.

22 Claims, 15 Drawing Sheets

(51) Int. Cl.
    *B01D 46/00*     (2022.01)
    *B01D 46/02*     (2006.01)

(52) U.S. Cl.
    CPC ..... *A47L 2201/04* (2013.01); *B01D 2265/028* (2013.01); *B01D 2265/04* (2013.01); *B01D 2271/02* (2013.01); *B01D 2273/30* (2013.01); *B01D 2279/55* (2013.01)

(58) Field of Classification Search
    CPC ............ B01D 2265/04; B01D 2271/02; B01D 2273/30; B01D 2279/55
    See application file for complete search history.

(56) References Cited

U.S. PATENT DOCUMENTS

| | | | |
|---|---|---|---|
| 6,446,303 B1 * | 9/2002 | Paterson | .................. A47L 9/14 55/369 |
| 10,842,334 B2 | 11/2020 | Wolff et al. | |
| D924,522 S | 7/2021 | Jang | |
| 2019/0335967 A1 | 11/2019 | Jang | |
| 2020/0069139 A1 | 3/2020 | Johnson et al. | |
| 2020/0281430 A1 | 9/2020 | Morin et al. | |
| 2021/0038034 A1 | 2/2021 | Na et al. | |

OTHER PUBLICATIONS

International Search Report in International Appln. No. PCT/US2022/073460, mailed Jan. 5, 2023, 19 pages.
Invitation to Pay Additional Fees in International Appln. No. PCT/US2022/073460, mailed Nov. 8, 2022, 13 pages.
etsy.com [online] "Reusable iRobot clean base dirt disposal bag," Jul. 8, 2021, retrieved on Sep. 28, 2021, retrieved from URL <https://www.etsy.com/listing/1027118060/reusable-irobot-clean-base-dirt-disposal?ga_order=most_relevant&ga_search_type=all&ga_view_type=gallery&ga_search_query=reusable+irobot+bag&ref=sr_gallery-1-2&pro=1&frs=1>, 14 pages.
etsy.com [online], "Clean Base Zipper Bag—Reusable iRobot Clean Base Automatic Dirt Disposal Bag for i3+, i6+, i7+, i8+, or s9+," Aug. 6, 2021, retrieved from URL <https://www.etsy.com/listing/1031012068/clean-base-zipper-bag-reusable-irobot?ga_order=most_relevant&ga_search_type=all&ga_view_type=gallery&ga_search_query=reusable+irobot+bag&ref=sr_gallery-1-3&frs=1>, 12 pages.

* cited by examiner

FILTERING DEVICES FOR EVACUATION STATIONS

TECHNICAL FIELD

This specification relates to filtering devices for evacuation stations.

BACKGROUND

Autonomous cleaning robots are robots that can perform desired cleaning operations, such as vacuum cleaning, in environments without continuous human guidance. An autonomous cleaning robot can automatically dock with an evacuation station for the purpose of emptying its debris bin of vacuumed debris. During an evacuation operation, the evacuation station can draw debris collected by the robot into the evacuation station. The drawn debris can be stored in a receptacle within the evacuation station. When the debris collected in the receptacle has reached a debris capacity of the receptacle, the receptacle must be emptied or replaced before the evacuation station can perform additional evacuation operations.

SUMMARY

In certain systems, a filtering device in an evacuation station can include a bag with an inlet for receiving debris. After becoming full with debris, the bag can be discarded, such as to avoid emptying the bag through the inlet, which can be difficult and can also generate dust clouds in the vicinity of the user. The inventors have recognized that it may be possible to provide a filtering device that includes a mechanism for easily emptying the bag, thereby making the bag reusable.

The systems, devices, methods, and other features described herein can include the advantages below and described herein elsewhere. For example, the features described herein can improve the efficiency and performance of autonomous cleaning robots, evacuation stations, and filtering devices.

After removing a filtering device from an evacuation station, the user can more easily discard the debris contained within the filtering device. In some implementations, an access door such as those described herein, can provide access to a space within the filtering device so that the debris contained by the filtering device can be removed more efficiently. In some cases, the access provided by the access door can be via an opening that is larger than an inlet of the filtering device. This can make it faster and easier for a user to remove the debris contained within the filtering device than it would be for the user to extract the debris via the inlet. This may encourage a user to reuse the filtering device rather than replacing it once the filtering device is full. In some implementations, a magnetic flap, a slider mechanism, and/or a zipper, such as those described herein, can provide similar advantages to an access door.

In one aspect, a filtering device includes a filter bag configured to collect debris evacuated from a cleaning robot by an evacuation station. The filtering device includes an interface assembly configured to interface with the evacuation station. The interface assembly includes a base attached to the filter bag along an opening of the filter bag, an opening of the base aligned with the opening of the filter bag. The interface assembly also includes an access door. The interface assembly further includes one or more hinges connecting the base and the access door, wherein the access door is rotatable about the one or more hinges from a closed position to an open position.

In another aspect, an evacuation station is featured. The evacuation station includes an airflow pathway, a robot interface configured to pneumatically connect a debris bin of a cleaning robot to the airflow pathway, and a filtering device pneumatically connected to the airflow pathway. The filtering device includes a filter bag and an interface assembly configured to interface with the evacuation station. The interface assembly includes a base attached to the filter bag along an opening of the filter bag, an opening of the base aligned with the opening of the filter bag. The interface assembly also includes an access door. The interface assembly further includes one or more hinges connecting the base and the access door, wherein the access door is rotatable about the one or more hinges from a closed position to an open position. The evacuation station further includes an air mover configured to produce a flow of air through the airflow pathway such that debris is evacuated from the debris bin of the cleaning robot, travels through the airflow pathway, and is collected in the filter bag.

In another aspect, a system including a cleaning robot and an evacuation station is featured. The cleaning robot includes a drive system configured to move the robot across a floor surface, one or more implements configured to remove debris from the floor surface, and a debris bin configured to collect the debris removed from the floor surface by the one or implements. The evacuation station includes an airflow pathway, a robot interface configured to pneumatically connect the debris bin of the cleaning robot to the airflow pathway, and a filtering device pneumatically connected to the airflow pathway. The filtering device includes a filter bag and an interface assembly configured to interface with the evacuation station. The interface assembly includes a base attached to the filter bag along an opening of the filter bag, an opening of the base aligned with the opening of the filter bag. The interface assembly also includes an access door. The interface assembly further includes one or more hinges connecting the base and the access door, wherein the access door is rotatable about the one or more hinges from a closed position to an open position. The evacuation station further includes an air mover configured to produce a flow of air through the airflow pathway such that debris is evacuated from the debris bin of the cleaning robot, travels through the airflow pathway, and is collected in the filter bag.

Implementations can include the examples described below and herein elsewhere.

In some implementations, the access door is configured to (i) provide access to a space within the filter bag via the opening of the base when the access door is in the open position and (ii) limit access to the space within the filter bag via the opening of the base when the access door is in the closed position. In some implementations, the access door includes an inlet configured to interface with an outlet of the evacuation station to pneumatically connect the space within the filter bag with the outlet of the evacuation station. In some implementations, the filtering device is pneumatically connected to the airflow pathway of the evacuation station via the inlet. The access door can further include a conduit, wherein an opening of the conduit is aligned with the inlet and wherein the conduit extends into the space within the filter bag when the access door is in the closed position. In some implementations, the access door can further include a slider including an opening. The slider can be configured to move between a first position and a second position, wherein the opening of the slider is aligned with the inlet in the first position and wherein the opening of the slider is misaligned with the inlet in the second position. In some implementations, an area of the opening of the base is greater than an area of the inlet.

In some implementations, a substantially airtight seal is formed along one or more edges of the interface assembly when the access door is in the closed position. In some implementations, the substantially airtight seal can be formed between the base and the access door.

In some implementations, the one or more hinges are disposed on a lateral edge of the interface assembly.

In some implementations, the interface assembly further includes a latch mechanism configured to secure the access door in the closed position. The one or more hinges can be disposed on a first lateral edge of the interface assembly, and the latch mechanism can be disposed on a second lateral edge of the interface assembly, the second lateral edge being opposite the first lateral edge. In some implementations, the latch mechanism includes a keeper disposed on the base of the interface assembly and a latch disposed on the access door. In some implementations, the latch can have a length of 2 to 15 cm and a width of 1 to 3 cm. In some implementations, the latch mechanism includes one or more detents.

In some implementations, a front of the base includes one or more ribbed features.

In some implementations, the interface assembly has a length of 12 to 20 cm, a width of 9 to 16 cm, and a depth of 5 to 80 mm in the closed position.

In some implementations, the base is attached to the filter bag using at least one of an adhesive attachment, a welding, or an interference fit mechanism.

In another aspect, a method for emptying a filtering device of an evacuation station is featured. The method includes removing the filtering device from the evacuation station and rotating an access door of the filtering device relative to a base of the filtering device to provide access to a space within a filter bag of the filtering device through an opening of the base. The method further includes removing debris from the space within the filter bag through the opening of the base.

Implementations can include the examples described below and herein elsewhere.

In some implementations, the method includes receiving a notification that the filtering device is in a full state prior to removing the filtering device from the evacuation station. The method can further include determining the full state of the filtering device based on one or more signals generated by a sensor positioned proximate an airflow pathway through the evacuation station.

In some implementations, removing the filtering device includes disengaging an inlet of the filtering device from an outlet of the evacuation station.

In some implementations, the access door of the filtering device further includes a conduit including an opening aligned with an inlet of the filtering device and a slider including an opening that is movable relative to the inlet. The method can further include moving the slider of the access door relative to the inlet such that the opening of the slider is misaligned with the inlet.

In some implementations, the method includes prior to rotating the access door, releasing a latch mechanism that secures the access door in a closed position.

In some implementations, rotating the access door includes rotating the access door to an open position, and the method further includes rotating the access door to a closed position subsequent to removing the debris from the space within the filter bag. The method can further include reinserting the filtering device into the evacuation station.

In some implementations, the method includes, prior to removing the filtering device from the evacuation station, operating the evacuation station to evacuate debris from a cleaning robot.

In some implementations, rotating the access door includes rotating the access door about one or more hinges that connect the access door to the base of the filtering device.

In another aspect, a filtering device includes a filter bag, an interface assembly, and a releasable magnetic flap. The filter bag is configured to collect debris evacuated from a cleaning robot by an evacuation station. The interface assembly is configured to interface with the evacuation station. The releasable magnetic flap is configured to provide access to a space within the filter bag.

Implementations can include the examples described below and herein elsewhere.

In some implementations, the interface assembly includes an inlet configured to interface with an outlet of the evacuation station to pneumatically connect the space within the filter bag with the outlet of the evacuation station. The filtering device can further include a conduit, wherein an opening of the conduit is aligned with the inlet and wherein the conduit extends into the space within the filter bag.

In some implementations, the magnetic flap is disposed on the filter bag in a position substantially opposite a position of the interface assembly.

In some implementations, the magnetic flap provides a seal that prevents escape of the debris from the filter bag when the magnetic flap is configured in an unreleased position. A strength of one or more magnets of the magnetic flap can be sufficient to maintain the magnetic flap in the unreleased position when a flow of air is generated by the evacuation station.

In some implementations, the releasable magnetic flap has a substantially rectangular shape. The releasable magnetic flap can be attached to the filter bag along one edge of the substantially rectangular shape.

In some implementations, one or more magnets are disposed on the releasable magnetic flap, between 0 cm and 5 cm from at least one edge of the flap. The filter bag can include magnetic material disposed around a rear-facing opening of the filter bag, the magnetic material configured to interact with the one or more magnets.

The details of one or more implementations of the subject matter described in this specification are set forth in the accompanying drawings and the description below. Other potential features, aspects, and advantages will become apparent from the description, the drawings, and the claims.

DETAILED DESCRIPTION

An evacuation station for an autonomous cleaning robot can be used to evacuate debris collected by the robot between cleaning operations performed by the robot. After the robot performs a cleaning operation and collects debris, the evacuation station can generate an airflow to draw debris contained in the robot into a receptacle of the evacuation station, thereby enabling the robot leave the evacuation station and perform another cleaning operation to collect more debris. A conduit in the receptacle to direct debris received from the robot into the receptacle can be susceptible to clogs or other obstructions that can prevent a full debris capacity of the receptacle from being utilized. As described herein, a filtering device containing the receptacle can include a conduit that is configured to inhibit formation of clogs or other obstructions proximate the conduit. Once the receptacle is filled with debris, a user can manually empty the filtering device of the debris so that the filtering device can be reused. As described herein, the filtering device can include an access door, a releasable magnetic flap, a slider mechanism, or a zipper to provide the user with access to the receptacle for faster and easier removal of the debris.

Figure 1:
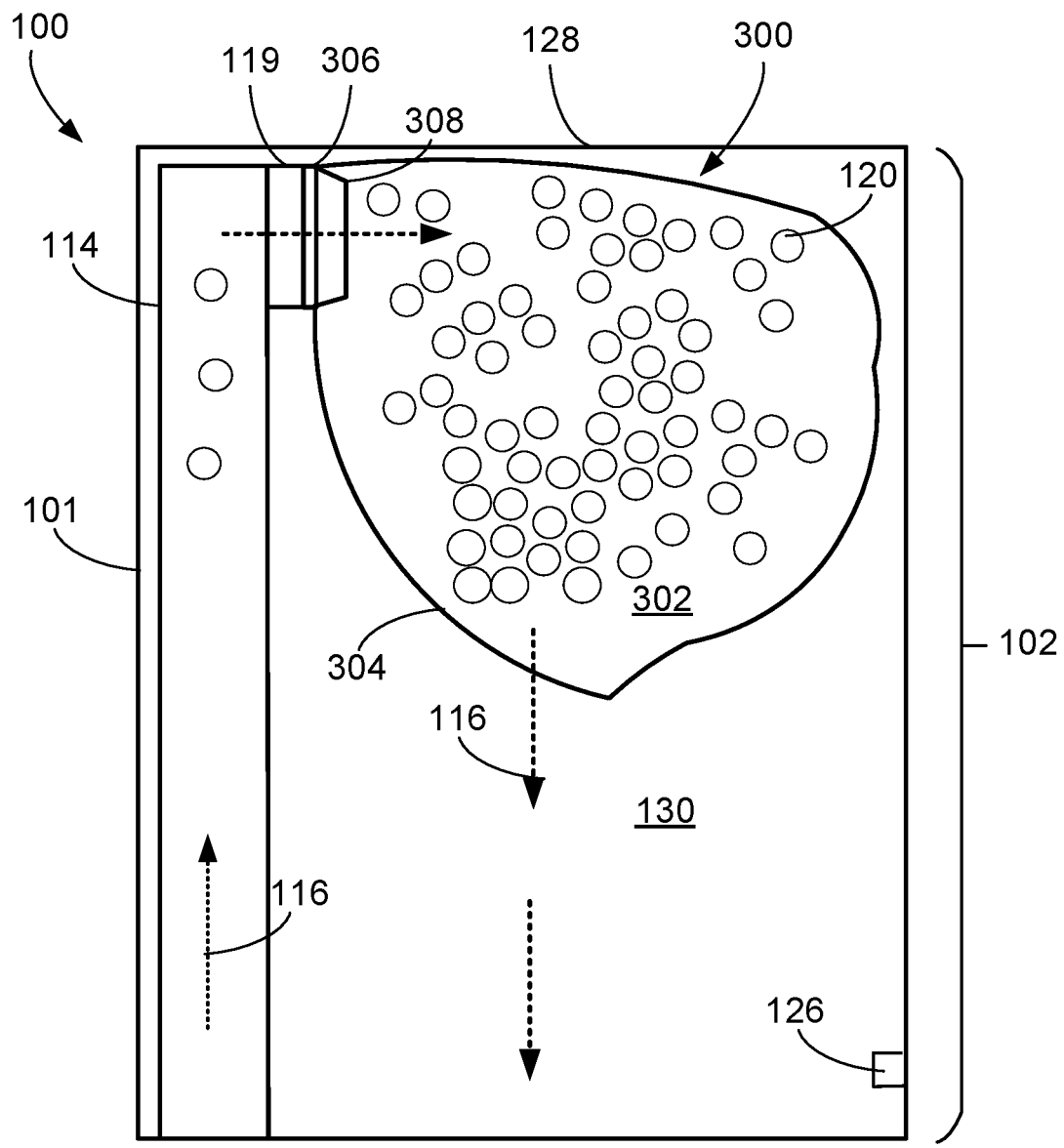
FIG. 1 is a schematic side view of a portion of an evacuation station with a filtering device.

Referring to FIG. 1, an evacuation station 100 includes a top portion 102 within which a filtering device 300 with a receptacle 302 for debris is located. The filtering device 300 includes a filter bag 304 at least partially forming the receptacle 302, which is a space within the filter bag 304. The filtering device 300 further includes an inlet 306 and a conduit 308. The inlet 306 is configured to interface with an outlet of one or more conduits of the evacuation station 100. For example, the one or more conduits of the evacuation station 100 includes a conduit 114 that includes an outlet 119 configured to interface with the inlet 306. The conduit 308 of the filtering device 300 is configured to pneumatically connect the inlet 306 of the filtering device 300 to the receptacle 302. The conduit 308 extends inwardly, from the inlet 306 into the receptacle 302. The conduit 308 is an example of a conduit described herein configured to inhibit accumulation of debris within the conduit and thereby inhibit the formation of clogs or obstructions proximate the conduit 308.

The evacuation station 100 includes a housing 101 (shown in FIGS. 1-4). The housing 101 of the evacuation station 100 can include one or more interconnected structures that support various components of the evacuation station 100, including an air mover 117 (shown in FIG. 2), a system of airflow paths for airflow generated by the air mover 117, and a controller 113 (shown in FIG. 2).

Figure 2:
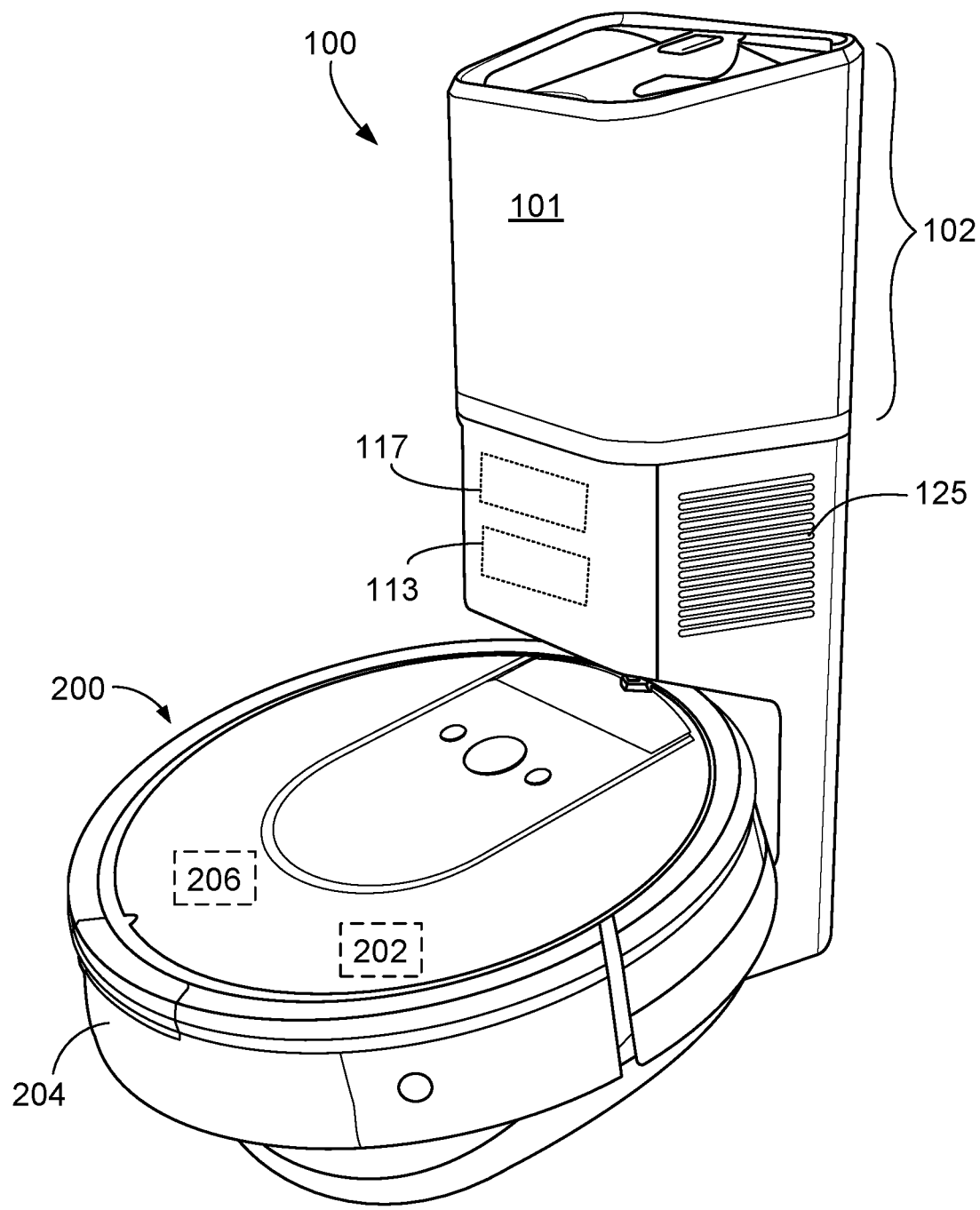
FIG. 2 is a front perspective view of a system including an autonomous mobile robot and the evacuation station of FIG. 1.

FIG. 1 illustrates the evacuation station 100 during an evacuation operation in which the controller 113 operates the air mover 117 to generate airflow 116 through air pathways of the evacuation station 100. Referring to FIG. 2 showing a system, e.g., a debris collection system, including the evacuation station 100 and an autonomous cleaning robot 200, the evacuation station 100 performs an evacuation operation when the autonomous cleaning robot 200 and the evacuation station 100 are interfaced with one another. The robot 200 performs a cleaning operation in a room, e.g., a room of a commercial, residential, industrial, or other type of building, and collects debris from a floor surface of the room as the robot 200 autonomously moves about the room. The robot 200 includes implements that enable the robot to remove the debris from the floor surface. For example, the robot 200 can include an air mover 202 that draws air from a portion of the floor surface below the robot 200 and hence draws any debris on that portion of the floor surface into the robot 200. The robot 200 can also include one or more rotatable members (not shown) facing the floor surface that engage the debris on the floor surface and mechanically moves the debris into the robot 200. The one or more rotatable members can include a roller, a brush, a flapper brush, or other rotatable implements that can engage debris and direct the debris into the robot 200. The debris removed from the floor surface is directed into a debris bin 204 of the robot 200, where it is collected. A controller 206 of the robot 200 operates a drive system (not shown) of the robot 200, e.g., including motors and wheels that are operable to propel the robot 200 across the floor surface, to navigate the robot 200 about the room and thereby clean different portions of the room.

During the cleaning operation, the controller 206 can determine that the debris bin 204 is full. For example, the controller 206 can determine that debris accumulated in the debris bin 204 has exceeded a certain percentage of the total debris capacity of the debris bin 204, e.g., more than 70%, 80%, or 90% of the total debris capacity of the debris bin 204. After making such a determination, the controller 206 operates the drive system of the robot 200 to direct the robot 200 toward the evacuation station 100. In some implementations, the robot 200 includes a sensor system including an optical sensor, an acoustic sensor, or other appropriate sensor for detecting the evacuation station 100 during the robot's navigation about the room to find the evacuation station 100.

The evacuation station 100 can perform an evacuation operation to draw debris from the debris bin 204 of the robot 200 into the evacuation station 100. To enable the evacuation station 100 to remove debris from the robot 200, the robot 200 interfaces with the evacuation station 100. For example, the robot 200 can autonomously move relative to the evacuation station 100 to physically dock to the evacuation station 100. In other implementations, a conduit (not shown) of the evacuation station 100 is manually connected to the robot 200. To interface with the evacuation station 100, in some implementations, an underside of the robot 200 includes an outlet (not shown) that engages with the intake 118 of the evacuation station 100, shown in FIG. 3. For example, the outlet of the robot 200 can be located on an underside of the debris bin 204 and can be an opening that engages with a corresponding opening of the intake 118.

While the robot 200 interfaces with the evacuation station 100, the debris bin 204 is in pneumatic communication with the air mover 117 of the evacuation station 100. In addition, in some implementations, the robot 200 is in electrical communication with the evacuation station 100 such that the evacuation station 100 can charge a battery of the robot 200 when the robot 200 interfaces with the evacuation station 100. Thus, while interfaced with the robot 200, the evacuation station 100 can simultaneously evacuate debris from the robot 200 and charge the battery of the robot 200. In other implementations, the evacuation station 100 charges the battery of the robot 200 only while the evacuation station 100 is not evacuating debris from the robot 200.

Referring also to FIG. 1, during the evacuation operation while the evacuation station 100 is interfaced with the robot 200, the airflow 116 generated by the evacuation station 100 travels through the debris bin 204, through airflow pathways of the evacuation station 100, and through the filtering device 300 while carrying debris 120 drawn from the robot 200. The airflow pathways of the evacuation station 100 include the one or more conduits of the evacuation station 100. In addition to including the conduit 114, the one or more conduits can also include conduits 122, 124. The conduit 122 includes the intake 118 of the evacuation station 100 and is connected with the conduit 124, and the conduit 124 is connected with the conduit 114. In this regard, the airflow 116 travels through the one or more conduits of the evacuation station 100 by travelling through the conduit 122, the conduit 124, and conduit 114. The airflow 116 exits the one or more conduits through the outlet 119 into the inlet 306 of the filtering device 300, and then travels through the conduit 308. The airflow 116 further travels through a wall of the filter bag 304 toward the air mover 117. The wall of the filter bag 304 serves as a filtering mechanism, separating a portion of the debris 120 from the airflow 116.

In some implementations, the evacuation station 100 can include a removable filter (not shown). The filter can be a small or fine particle filter. For example, particles having a width between about 0.1 to 0.5 micrometers carried by the airflow 116 after the airflow 116 exits the filtering device 300 are removed by the filter. The filter can be positioned between the filtering device 300 and the air mover 117. After the airflow 116 exits the filtering device 300 and travels beyond the filter, the air mover 117 directs the airflow 116 out of the evacuation station 100, in particular, through an exhaust 125 (shown in FIG. 2). As described herein, the evacuation station 100 can continue to perform the evacuation operation until a sensor 126 (shown in FIGS. 1 and 3) of the evacuation station 100 detects that the receptacle 302 is full. In some implementations, the sensor 126 is positioned proximate a flow path for the flow of air. As described herein, in some implementations, the sensor 126 is a pressure sensor. In other implementations, the sensor 126 is an optical sensor, a force sensor, or other sensor that can generate one or more signal indicative of a fullness state of the filtering device 300.

Figure 4:
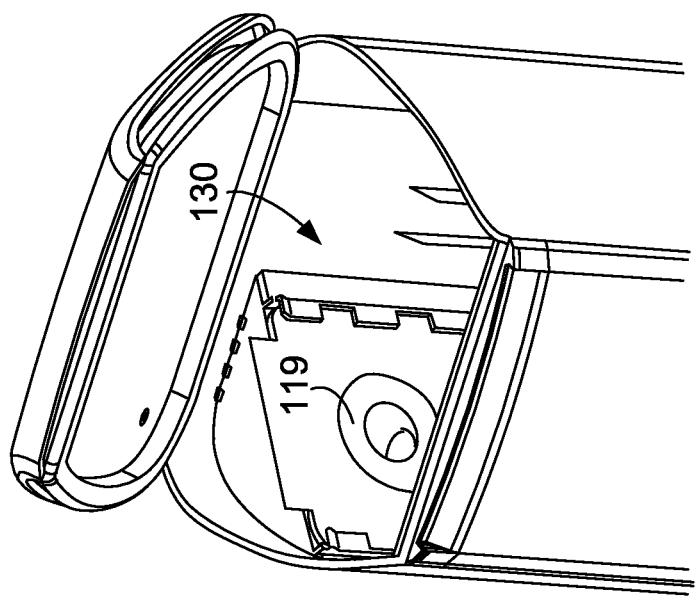
FIG. 4 is a top perspective view of an upper portion of the evacuation station of FIG. 1.
Figure 3:
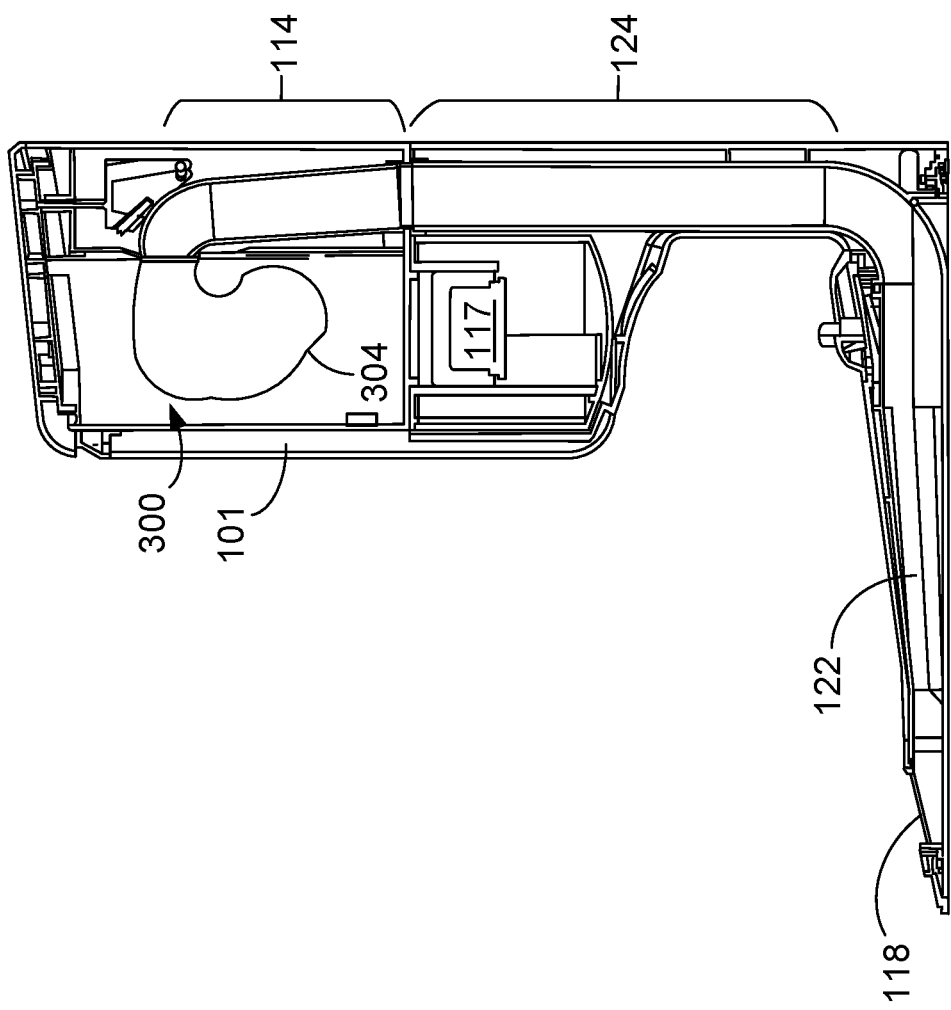
FIG. 3 is a side cross-sectional view of the evacuation station of FIG. 1.

The filtering device 300 is disconnectable and removable from the evacuation station 100. Referring to FIG. 4, the housing 101 of the evacuation station 100 includes a cover 128 along the top portion 102 of the evacuation station 100. The cover 128 covers a receptacle 130 of the evacuation station 100. The receptacle 130 can receive the filtering device 300. The cover 128 is movable between a closed position (shown in FIG. 3) and an open position (shown in FIG. 4). In the open position of the cover 128, a filtering device is insertable into the receptacle 130 or is removable from the receptacle 130. For example, the filtering device 300 can be placed into the receptacle to be connected with the one or more conduits of the evacuation station 100. In addition, the filtering device 300 can be disconnected from the one or more conduits of the evacuation station and then removed from the receptacle 130, thereby enabling a new filtering device to be inserted into the receptacle.

Figure 5:
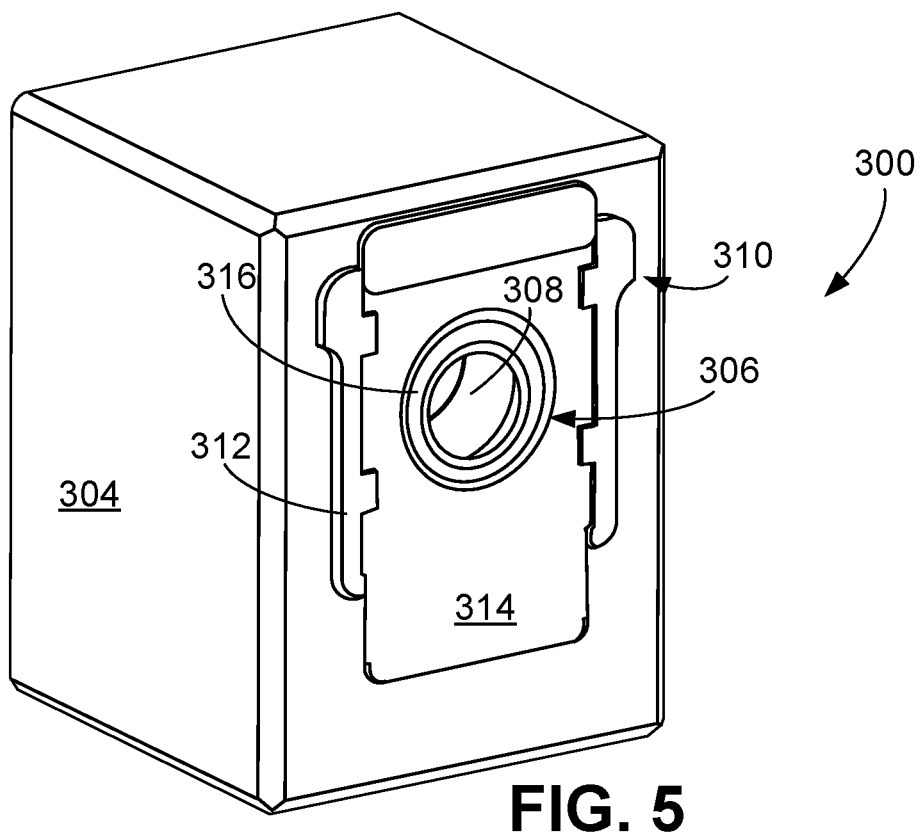
FIG. 5 is a front perspective view of the filtering device of FIG. 1.
Figure 6:
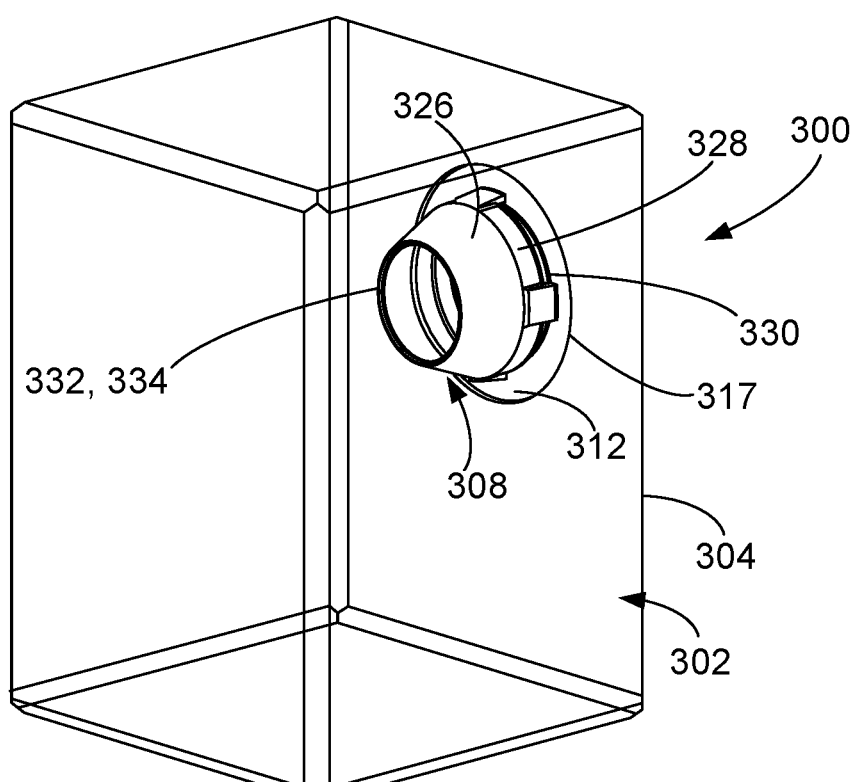
FIG. 6 is a side perspective view of the filtering device of FIG. 1 in which a filter bag of the filtering device is shown as transparent.
Figure 7:
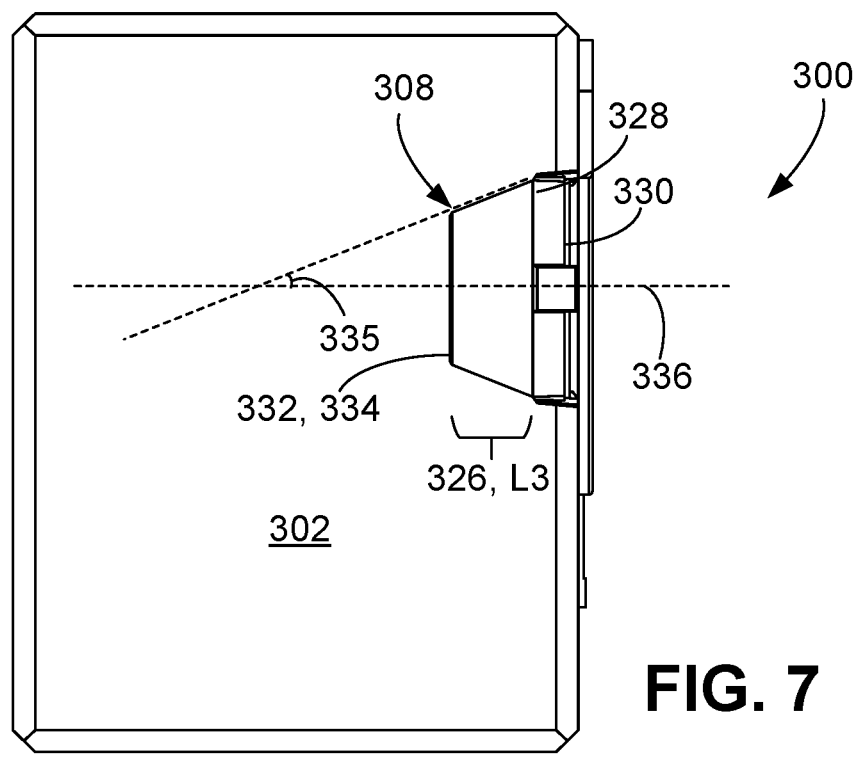
FIG. 7 is a side view of the filtering device of FIG. 1 in which a filter bag of the filtering device is shown as transparent.

FIGS. 5-7 illustrate an example of the filtering device 300. Referring to FIG. 5, the filtering device 300, as described herein, includes the filter bag 304, the inlet 306, and an interface assembly 310. In some implementations, the filtering device 300 can be disposable, e.g., after the debris collected in the receptacle 302 has exceeded a certain debris capacity of the receptacle 302. In some implementations, the filtering device 300 can be emptied of the collected debris. In some implementations, the filtering device 300 can be reusable, e.g., after removing the debris collected in the receptacle 302.

The filter bag 304 at least partially forms the receptacle 302 and is formed of a material through which air can travel. The material of the filter bag 304 is selected such that the filter bag 304 can serve as a separator that separates and filters at least a portion of the debris out of the airflow 116 generated by the evacuation station 100. For example, the filter bag 304 can be formed of paper; fabric; a composite fiber; or a spunbound, nonwoven, or melt blown material (e.g., polypropylene [PP] or ethylene-propylene side by side [ES]) that allows air to pass through but traps dirt and debris and thereby retains the debris within the receptacle 302. In some implementations, the filter bag 304 can be formed of multiple layers of material. For example, the filter bag 304 can include four layers formed of, from the outer layer to the inner layer: (i) 30 g/m$^2$ white spunbound PP, (ii) 20 g/m$^2$ melt-blow PP, (iii) 20 g/m$^2$ melt-blow PP, and (iv) 30 g/m$^2$ fluffy nonwoven ES/PP. In another example, the filter bag 304 can include four layers formed of, from the outer layer to the inner layer: (i) 50 g/m$^2$ gray spunbound PP, (ii) 30 g/m$^2$ melt-blow PP, (iii) 30 g/m$^2$ fluffy nonwoven ES/PP, and (iv) 15 g/m$^2$ white spunbound PP. The material of the filter bag 304 is flexible, enabling the filter bag 304 to be folded and easily stored. In addition, the filter bag 304 can expand to accommodate additional debris as the filter bag 304 collects debris during an evacuation operation. The filter bag 304, while collecting debris via filtration, is porous to permit the airflow 116 to exit the filter bag 304 with an amount of debris less than the amount of debris with the airflow 116 as the airflow 116 enters the filtering device 300. For example, the filter bag 304 can collect debris having a width greater than 1 micrometer, e.g., greater than 3 micrometers, 10 micrometers, 50 micrometers, or more.

Figure 8:
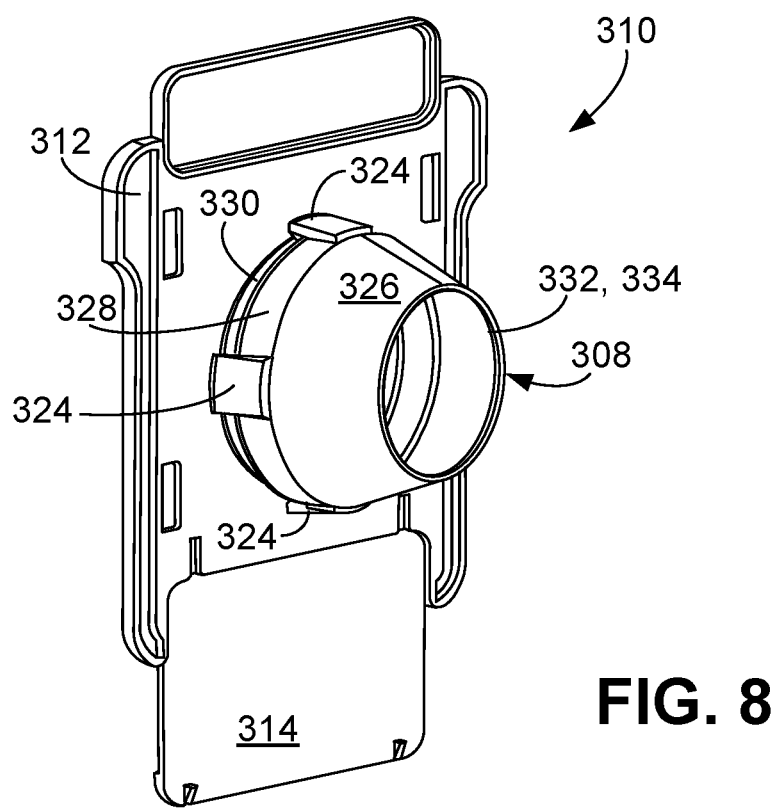
FIG. 8 is a rear perspective view of an interface assembly of the filtering device of FIG. 1.

Referring also to FIG. 8, the interface assembly 310 includes a collar 312, a cover 314, a seal 316, and the conduit 308. The interface assembly 310 is configured to interface with the one or more conduits of the evacuation station 100, e.g., with the conduit 114 (shown in FIGS. 1 and 3). For example, when the filtering device 300 is disposed into the receptacle 130 of the evacuation station 100 and the conduit 114 of the evacuation station 100 is in the protruded position, the intake 118 is placed into pneumatic communication with the receptacle 302 of the filtering device 300. Hence, when the robot 200 interfaces with the evacuation station 100, the debris bin 204 of the robot 200 is also placed into pneumatic communication with the receptacle 302 of the filtering device 300.

The seal 316 is attached to the collar 312 and is configured to engage the conduit 114. In particular, the seal 316 is an outward facing seal, e.g., facing away from the receptacle 302, that is configured to interface with the outlet 119 of the conduit 114. For example, in implementations in which the conduit 114 is movable in response to the movement of the cover 128, the conduit 114 can move into the protruded position and thereby contact the seal 316. The seal 316 is formed of a rubber, another elastomeric material, or a combination of different materials including an elastomeric material. The seal 316 includes an opening 338 that is part of the inlet 306 of the filtering device 300. The seal 316 can form a sealed engagement around an outer surface of the conduit 114. The seal engagement can prevent, inhibit, or otherwise reduce airflow leakage from the conduit 114 when the air mover 117 generates the airflow 116 and thus can improve the efficiency of the air mover 117.

Figure 10:
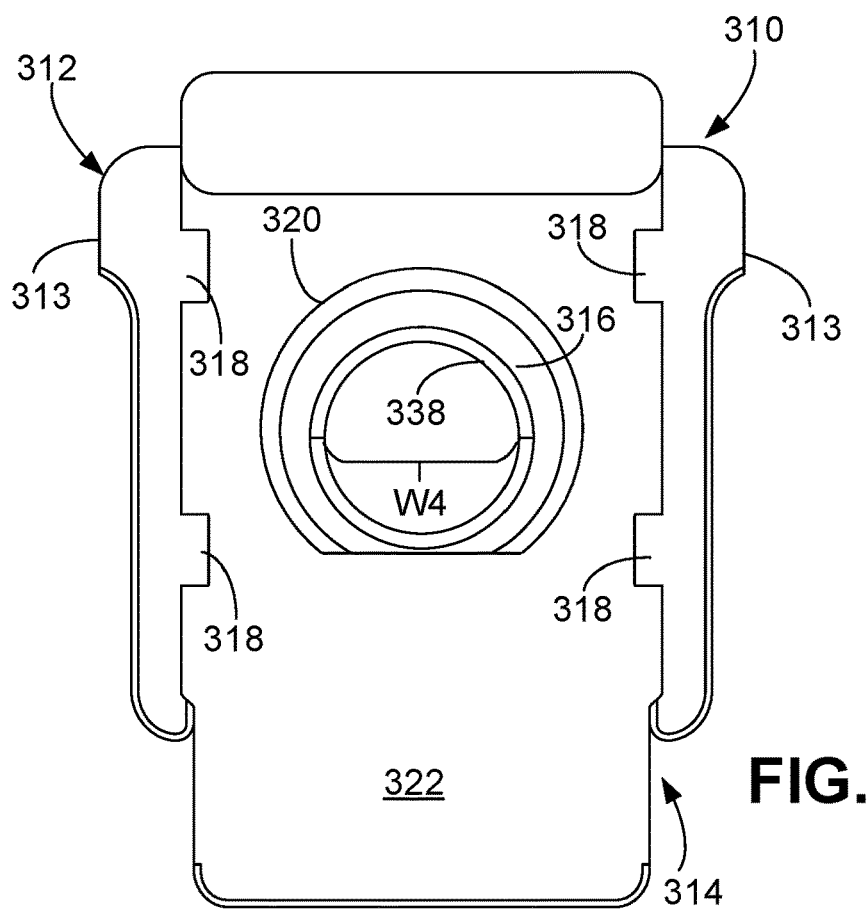
FIG. 10 is a front view of the interface assembly of FIG. 8.

The collar 312 is positioned along an opening 317 of the filter bag 304. The collar 312 is a substantially flat plate. For example, a thickness of the collar 312 is between 1.0 mm and 3.5 mm, e.g., between 1.0 mm and 2.0 mm, 1.5 mm and 2.5 mm, 2.0 mm and 3.0 mm, or 2.5 mm and 3.5 mm. While depicted in FIG. 10 as being substantially rectangular or square, in other implementations, the collar 312 is circular or has a polygonal shape. Referring also to FIG. 10, the collar 312 has a width W1 that is larger than a width W2 of the cover 314. For example the width of the collar 312 is 1.05 to 1.5 times larger than the width of the cover 314. For example, the width W1 of the collar 312 is between 7.0 cm and 12.0 cm, e.g., between 7.0 cm and 8.0 cm, 8.0 cm and 9.0 cm, 9.0 cm and 10.0 cm, 10.0 cm and 11.0 cm, or 11.0 cm and 12.0 cm, and the length W2 of the cover 314 is between 6.0 cm and 9.0 cm, e.g., between 6.0 cm and 6.5 cm, 6.5 cm and 7.0 cm, 7.0 cm and 7.5 cm, 7.5 cm and 8.0 cm, 8.0 cm and 8.5 cm. or 8.5 cm and 9.0 cm.

In some implementations, the collar 312 of the interface assembly 310 is attached directly to the filter bag 304. In some implementations, the collar 312 is welded to the filter bag 304. In other implementations, the collar 312 is attached to the filter bag 304 via a fastener, e.g., via stitches, clips, zippers, and other appropriate fasteners. The collar 312 is formed of a rigid polymeric material, such as polypropylene, polycarbonate, acrylonitrile butadiene styrene, nylon, or another appropriate polymer.

The cover 314 of the interface assembly 310 is movably attached to the collar 312. The cover 314 is a substantially flat plate. For example, a thickness of the cover 314 is between 0.5 mm and 3.5 mm, e.g., between 0.5 mm and 1.5 mm, 1.0 mm and 2.0 mm, 1.5 mm and 2.5 mm, 2.0 mm and 3.0 mm, or 2.5 mm and 3.5 mm. While depicted in FIG. 10 as being substantially rectangular, in other implementations, the cover 314 is circular or has a polygonal shape. Referring also to FIG. 10, the cover 314 has a length L2 longer than a length L1 of the collar 312, e.g., 1.25 to 2 times longer than the length of the collar 312. For example, the length L2 of the cover 314 is between 9.0 cm and 14.0 cm, e.g., between 9.0 cm and 12.0 cm, 10.0 cm and 13.0 cm, or 11.0 cm and 14.0 cm, and the length L1 of the collar 312 is between 6.0 cm and 11.0 cm, e.g., between 6.0 cm and 9.0 cm, 7.0 cm and 10.0 cm, or 8.0 cm and 11.0 cm.

The cover 314 is movable relative to the opening 317 of the filter bag 304 between an open position in which the opening 317 of the filter bag 304 is accessible via the inlet 306 of the filtering device and a closed position in which the opening 317 of the filter bag 304 is inaccessible. For example, referring to FIG. 8, the cover 314 is a slider that is slidable relative to the collar 312. The collar 312 includes clips 318 (shown in FIG. 10) attaching the cover 314 to the collar 312 while allowing the cover 314 to slide relative to the collar 312.

Referring to FIG. 10, the cover 314 includes an opening 320 and a body 322. The opening 320 can be a substantially circular opening in the body 322 of the cover 314. In some implementations, the opening 320 includes non-circular portions, or is otherwise polygonal. When the cover 314 is in the open position (as shown in FIG. 10), the opening 320 is aligned with and overlaps with the opening 317 of the filter bag 304 and the opening 338 defined by the seal 316. When the cover 314 is in the closed position (not shown), the opening 320 of the cover 314 is misaligned with the inlet 306 of the filtering device. In the closed position, the body 322 overlaps with and covers the opening 317 of the filter bag 304 and the opening 338 defined by the seal 316 such that debris cannot enter or exit from the receptacle 302 (shown in FIGS. 5 and 6).

The cover 314 is manually movable by a human user so that the user can easily close off the receptacle 302 to prevent debris from falling out the filtering device 300 when the user wishes to dispose of the filtering device 300. The collar 312 can further include tabs 313 that enable a human user to more easily grasp the collar 312 while manually moving the cover 314, and the length L2 of the cover 314 can be longer than the length L1 of the collar 312 so that the user can easily grasp the cover 314 and reposition the cover 314 relative to the collar 312.

The conduit 308 is a hollow tube-like structure that provides an airflow pathway for the airflow generated by the air mover 117 of the evacuation station 100 when the filtering device 300 is connected to the evacuation station 100. Referring to FIG. 6, the conduit 308 extends inwardly from the collar 312 into the receptacle 302 of the filtering device 300 and away from the filter bag 304. The extension of the conduit 308 into the receptacle 302 can have the advantage of improving the detection of a fullness of the filtering device 300, as described herein. The conduit 308 and the collar 312 are attached to one another. In some implementations, referring also to FIG. 8, the conduit 308 can include a first portion of a snap fit mechanism 324 attached to a second portion of the snap fit mechanism 324 on the collar 312. For example, the first portion of the snap fit mechanism 324 can include multiple snaps, and the second portion of the snap fit mechanism 324 can include multiple slots with which the multiple snaps are engaged. Alternatively, the first portion of the snap fit mechanism 324 can include multiple slots, and the second portion of the snap fit mechanism 324 can include multiple snaps configured to engage with the multiple slots.

The conduit 308 is formed from a rigid polymer. For example, referring to FIGS. 6-8, the conduit 308 can be formed from polypropylene, polycarbonate, acrylonitrile butadiene styrene, nylon, another appropriate polymer, or a combination of materials including an appropriate polymer. The conduit 308 tapers inward from the opening 317 of the filter bag 304 along at least a portion of the conduit 308. In some implementations, the conduit 308 includes a substantially frustoconical portion 326 that tapers away from the opening 317 of the filter bag 304.

The conduit 308 includes an attached end portion 330 attached to the collar 312, and a free end portion 332. The attached end portion 330 has an opening (not shown) having a width greater than a width W3 of the opening 334 and a width W4 of the opening 338 defined by the seal 316. The opening of the attached end portion 330 is positioned proximate the inlet 306 of the filtering device 300. The free end portion 332 includes an opening 334 within the receptacle 302.

Referring to FIG. 7, an angle 335 between an outer surface of the conduit 308 of the filtering device 300 and a longitudinal axis 336 of the conduit 308 of the filtering device 300 is between 10 and 45 degrees, e.g., between 10 and 25 degrees, 20 and 35 degrees, or 30 and 45 degrees. In some implementations, a portion 328 of the conduit 308 proximate the collar 312 is not tapered. For example, the portion 328 can be substantially cylindrical.

Figure 9:
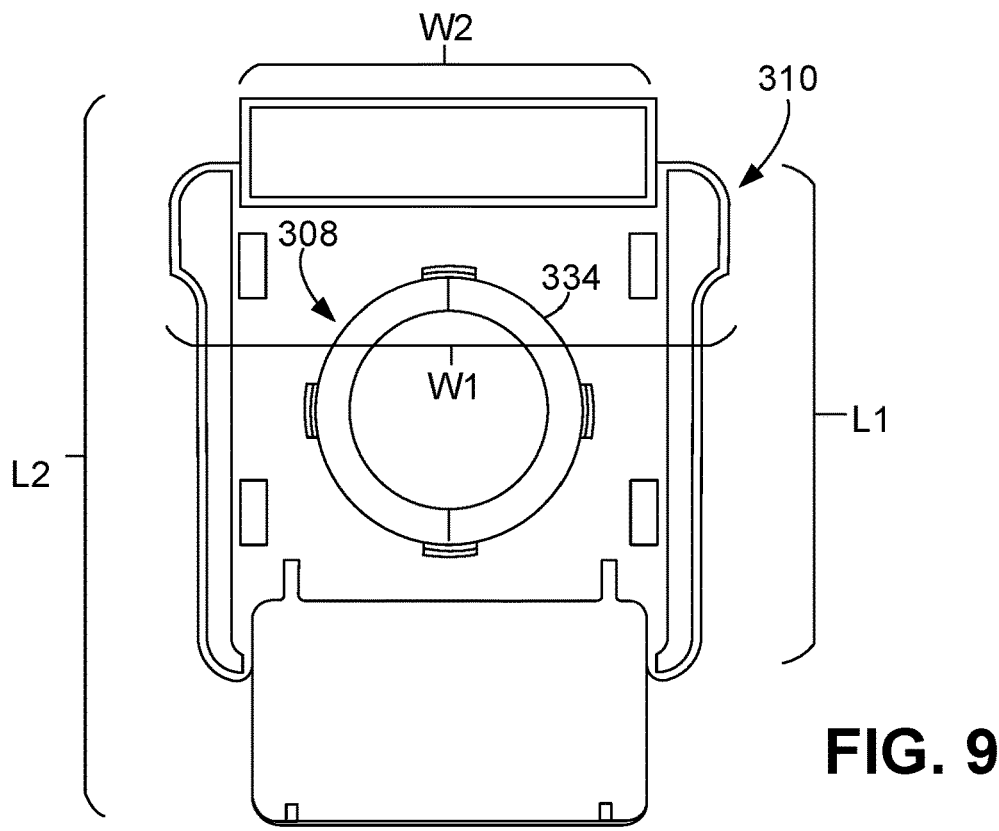
FIG. 9 is a rear view of the interface assembly of FIG. 8.

Referring to FIG. 9, a width W3 of the opening 334 of the conduit 308 is between 2.0 cm and 5.0 cm, e.g., between 2.0 cm and 3.0 cm, 3.0 cm and 4.0 cm, or 4.0 cm and 5.0 cm. Referring also to FIG. 10, the width W3 is substantially equal to a width W4 of the opening 338 defined by the seal 316. For example, the width W4 is between 90% and 110% of the width W3, e.g., between 90% and 100%, between 95% and 105%, or between 100% and 110% of the width W3. In implementations in which the opening 334 and the opening 338 are substantially circular, the widths W3, W4 correspond to diameters of the openings 334, 338. In other implementations, the openings 334, 338 are non-circular, e.g., polygonal. Referring also to FIG. 7, the width W3 is 1 to 2 times larger than a length L3 of the conduit 308, e.g., 1 to 1.5 times, 1.25 times to 1.75 times, or 1.5 times to 2 times larger than the length L3. The length L3 of the conduit 308, for example, corresponds to an overall distance from the opening 317 of the filter bag 304 to the opening 334 of the conduit 308. For example, the length L3 of the conduit 308 can be between 1 and 4 cm, e.g., between 1 and 2 cm, 2 and 3 cm, or 3 and 4 cm.

Figure 11A:
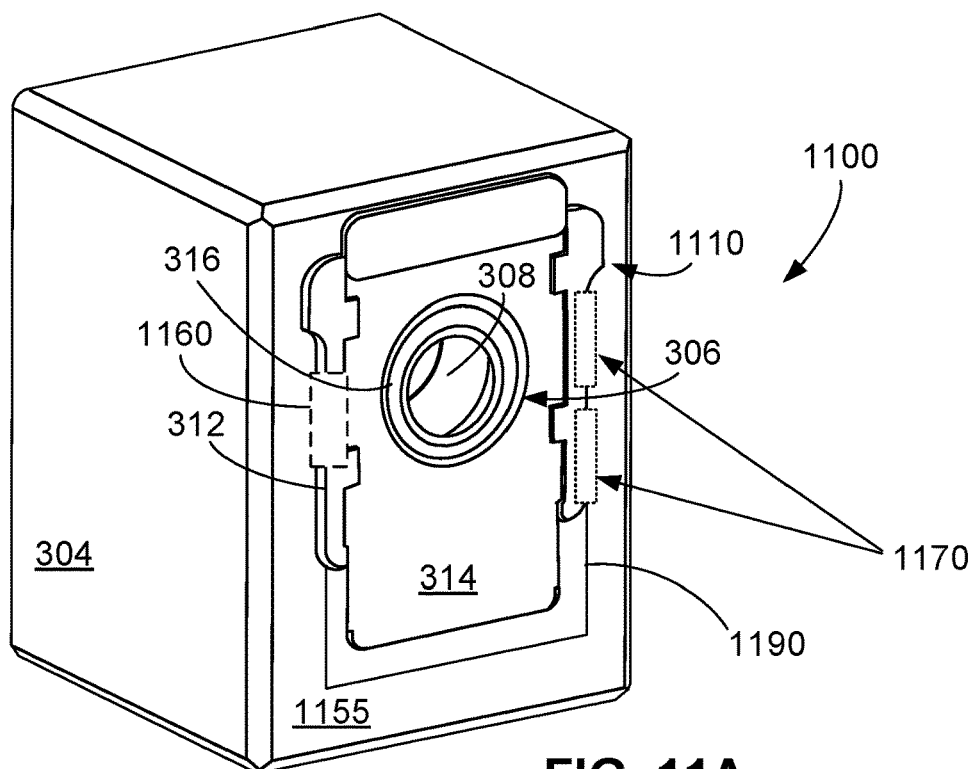
FIG. 11A is a front perspective view of a filtering device with a hinged interface assembly in a closed position.
Figure 11B:
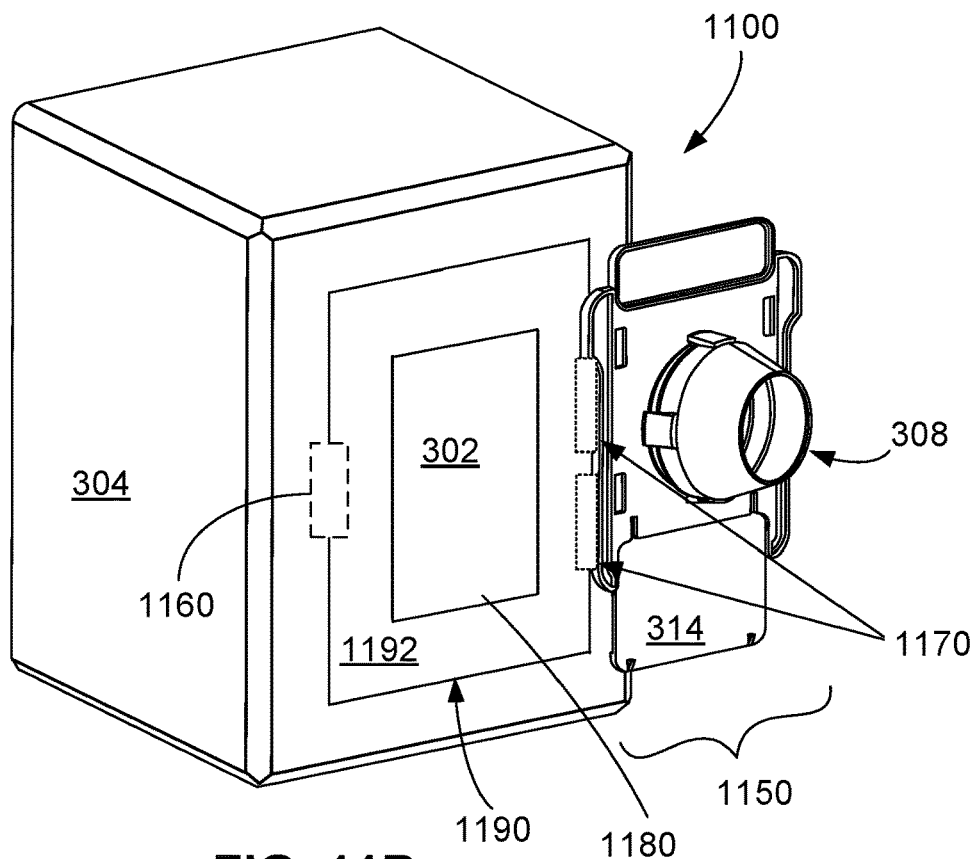
FIG. 11B is a front perspective view of a filtering device with a hinged interface assembly in an open position.
Figure 13:
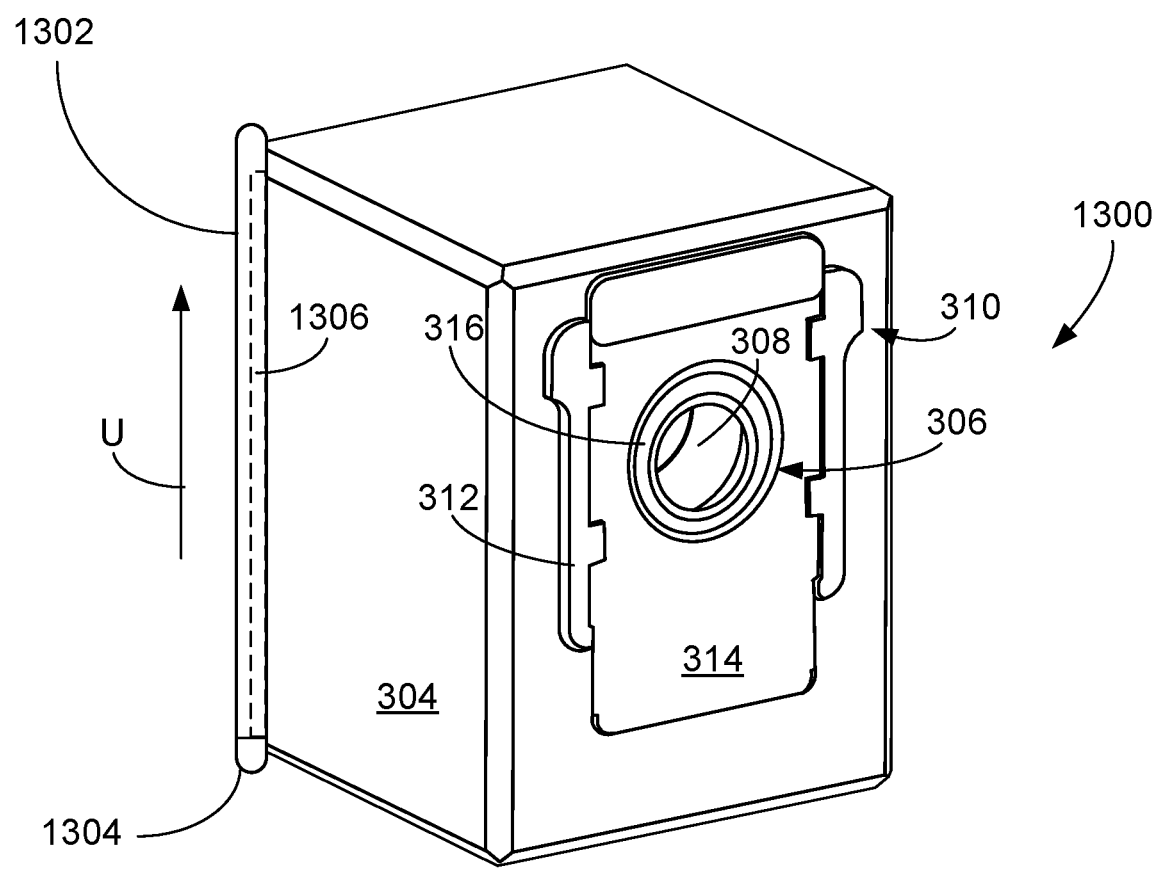
FIG. 13 is a front perspective view of a filtering device with a slider.
Figure 14:
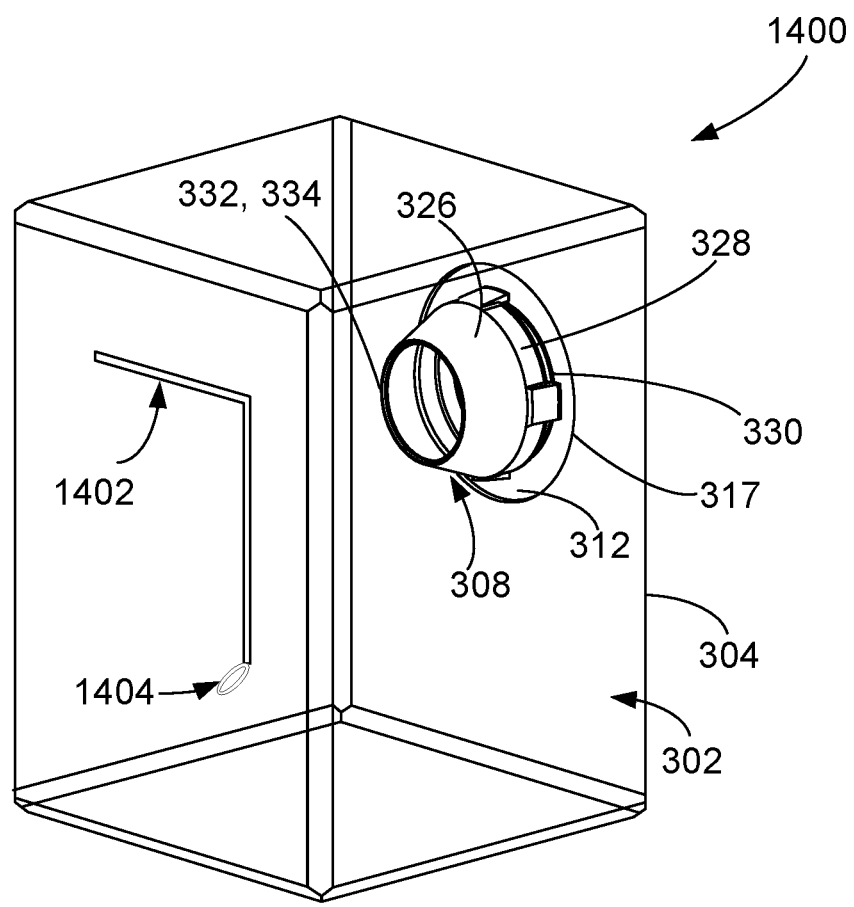
FIG. 14 is a side perspective view of a filtering device with a zipper.

In some implementations, the filtering device 300 can include one or more elements that can provide a user access to the receptacle 302. Access can be provided via an opening having an area greater than an area of the inlet 306. This can enable the user to more easily and quickly remove debris from the receptacle 302 so that the filtering device 300 can be reused. FIGS. 11A-14 illustrate example implementations of such filtering devices. FIGS. 11A-11B depict a filtering device 1200 with a hinged interface assembly including an access door 1150. FIG. 12 depicts a filtering device 1200 with a magnetic flap 1202. FIG. 13 depicts a filtering device 1300 with a slider mechanism. FIG. 14 depicts a filtering device 1400 with a zipper 1402.

Referring to FIGS. 11A-11B, in some implementations, a filtering device 1100 includes a filter bag 304 and an interface assembly 1110. In some cases, the filter bag 304 can be substantially similar to the filter bag 304 of the filtering device 300 (shown in FIG. 5), e.g., formed of a similar material or the same material, having a similar geometry or the same geometry, etc. However, in some cases, the filter bag 304 (shown in FIGS. 11A-11B) can have a different welding pattern, a different color, a different geometry, etc. In addition, the interface assembly 1110 has many similarities to the interface assembly 310 of the filtering device 300. For example, the interface assembly 1110 also includes a collar 312, an inlet 306, a conduit 308, a cover 314, and a seal 316. In contrast to the components of the filtering device 300, in the interface assembly 1110, the collar 312, the inlet 306, the conduit 308, the cover 314, and the seal 316 are components of an access door 1150 that is connected to a base 1190 of the interface assembly 1110 via hinges 1170. The access door 1150 is rotatable about the hinges 1170 from a closed position (shown in FIG. 11A) to an open position (shown in FIG. 11B), and vice versa. When the access door 1150 is the closed position, the access door 1150 limits access to the space, e.g., by a user or by a hand of a user, within the filter bag 304. When the access door 1150 is in the open position, the access door 1150 provides access to the space within the filter bag 304 via an opening 1180 of the base 1190.

In the interface assembly 1110, the base 1190 (rather than the collar 312, as in interface assembly 310) is positioned along an opening of the filter bag 304 such that the opening 1180 of the base 1190 is aligned with the opening of the filter bag 304. The base 1190 defines a perimeter of the opening 1180. The base 1190 is a substantially flat plate with the opening 1180 in an interior portion of the base 1190. The opening 1180 is a through-opening extending through an entire thickness of the base 1190. For example, a thickness of the base 1190 is between 1.0 mm and 3.5 mm, e.g., between 1.0 mm and 2.0 mm, 1.5 mm and 2.5 mm, 2.0 mm and 3.0 mm, or 2.5 mm and 3.5 mm. While depicted in FIG. 11B as being substantially rectangular or square, in other implementations, the base 1190 is circular or has a polygonal shape. Similarly, the shape of the opening 1180 in the base 1190 can have varying shapes in implementations. In some implementations, the opening 1180 has a polygonal shape, such as a rectangular shape. In other implementations, the opening 1180 has a circular or elliptical shape. The base 1190 includes an inner surface (not shown) facing the receptacle 302 of the filtering device 300, and an outer surface 1192 facing away from the receptacle 302 of the filtering device 300. The inner and outer surfaces can be planar, and can be parallel to a front surface 1155 of the filter bag 304.

In some implementations, the base 1190 of the interface assembly 1110 is attached directly to the filter bag 304. In some implementations, the base 1190 is welded or adhered to the filter bag 304. In other implementations, the base 1190 is attached to the filter bag 304 via a fastener, e.g., via stitches, clips, zippers, and other appropriate fasteners. In some implementations, the base 1190 is attached to the filter bag 304 using an interference fit mechanism. The base 1190 is formed of a rigid polymeric material, such as polypropylene, polycarbonate, acrylonitrile butadiene styrene, nylon, or another appropriate polymer. In some implementations, the material used for the base 1190 is more rigid than the material used for the filter bag 304. The filter bag 304 can be folded onto the base 1190. In some implementations, the base 1190 can include one or more ribbed features on the outer surface 1192 that provide structural support for the interface assembly 1110.

Referring to FIG. 11A, in the closed position, the access door 1150 at least partially defines one of the outer faces of the filtering device 300 that define the interior space of the filter bag 304. For example, the access door 1150 at least partially defines the receptacle 302 (shown in FIG. 11B) of the filter bag 304, and thus at least partially blocks debris from falling out or otherwise being removed from the filter bag 304. In particular, an opening 1180 in the base 1190 is at least partially covered by the access door 1150 when the access door 1150 is in the closed position. For example, the access door 1150 is positioned on an outer surface of the filter bag 304. In the example depicted in FIG. 11A, the base 1190 is attached to a front surface 1155 of the filter bag 304. The base 1190 at least partially defines an opening 1180. The access door 1150, in the closed position, extends at least partially across the opening 1180 of the base 1190. Furthermore, the access door 1150 is positioned over the front surface 1155. For example, planar surfaces of the access door 1150, e.g., planar surfaces of the collar 312 and the cover 314, can overlap with the front surface 1155 and the opening 1180 of the base 1190. In the closed position, the interior planar surfaces of the collar 312 and the cover 314 adjacent to the conduit 308 are substantially parallel to the front surface 1155 of the filter bag 304 and face an interior of the filter bag 304, e.g., face the receptacle 302 of the filter bag 304. In the closed position, the access door 1150 extends across the front surface 1155 of the filter bag 304 and covers 50% to 95% of the opening 1180 of the base 1190, e.g., covers 50% to 75%, 50% to 80%, 50% to 90%, 60% to 75%, 60% to 80%, 60% to 90%, 70% to 80%, 70% to 90%, 80% to 90%, at least 50%, at least 60%, at least 70%, at least 80%, or at least 90% of the area of the opening 1180 of the base 1190. When the access door 1150 is in the closed position, a substantially airtight seal can be formed between the base 1190 and the access door 1150. For example, the base 1190 and/or the access door 1150 can be lined, at least in part, by rubber or another elastomeric material, to produce the airtight seal. In some implementations, the airtight seal can be formed along one or more of the edges of the interface assembly 1110.

The access door 1150 in the open position is misaligned with the opening 1180 of the base 1190 and no longer covers the opening 1180 of the base 1190. The opening 1180 has a larger area than the area of the inlet 306, giving the user easier access to the space within the filter bag 304 (e.g., in order to remove debris).

To move the access door 1150 from the closed position to the open position, at least part of the access door 1150 is moved away from the opening 1180, from the base 1190, and from the front surface 1155 of the filter bag 304. This part of the access door 1150 is moved away while another part of the access door 1150 remains attached to the base 1190, e.g., via the hinges 1170. In particular, to move the part of the access door 1150 away from the opening 1180, the part of the access door 1150 is rotated about the hinges 1170. In some implementations, in the closed position, at least part of the access door 1150 extends into the receptacle 302, while in the open position, the access door 1150 is positioned entirely outside of the receptacle 302. For example, the collar 312 (shown in FIG. 11B) can extend into the receptacle 302 in the closed position, but is positioned outside of the receptacle 302 in the open position of the access door 1150. In some implementations, in the closed position of the access door 1150, an internal facing surface of the access door 1150, e.g., a surface of the collar 312 or a surface of the cover 314, contacts the base 1190, while in the open position of the access door 1150, this internal facing surface does not contact the base 1190. In some implementations, the hinges 1170 can allow for free rotation of the access door between the closed position (i.e., 0 degrees) and 180 degrees. In some implementations, the hinges 1170 can provide some friction between the closed position and 180 degrees, but still maintains an level of friction low enough for the access door 1150 to be able to open under the force of gravity. In some implementations, when the access door is rotated beyond 180 degrees (e.g., between 180 degrees and 270 degrees), the hinges 1170 can provide increased friction. For example, the amount of friction provided by the hinges 1170 when the access door is rotated beyond 180 degrees can be enough to counteract the force of gravity, or even greater forces, in order to hold the access door 1150 in the open position. In some implementations, the increased friction can be supplied by one or more detents on the hinges 1170 that hold the access door 1150 in the open position. In some implementations, the hinges 1170 can also include detents that hold the access door 1150 in the closed position (i.e., 0 degrees).

Figure 17:
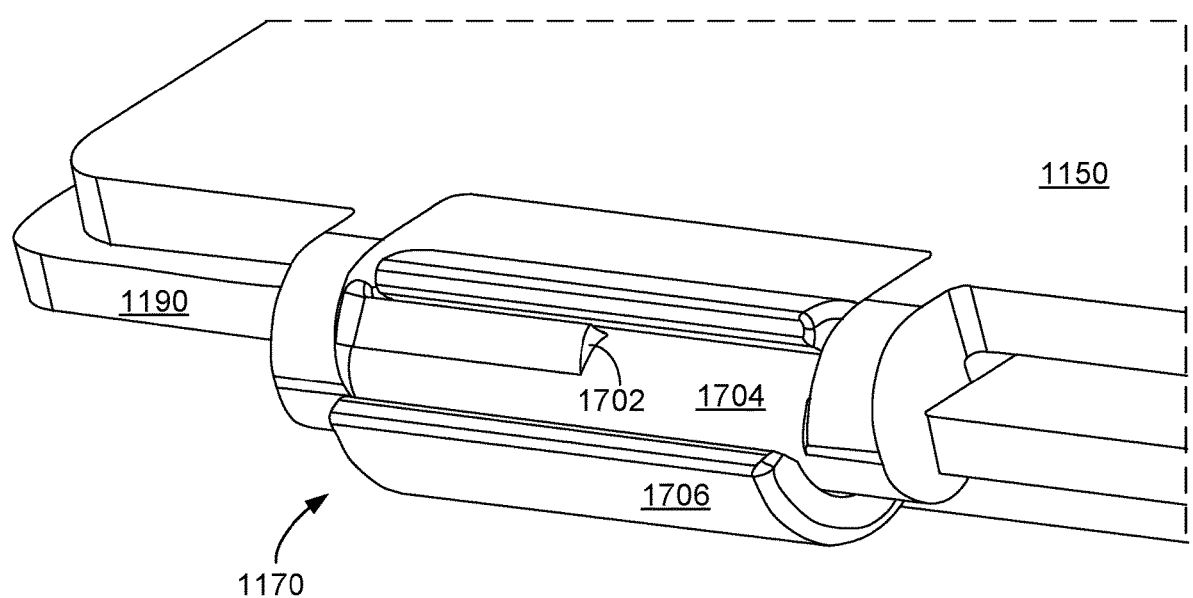
FIG. 17 is a perspective view of a hinge of a filtering device.
Figure 18:
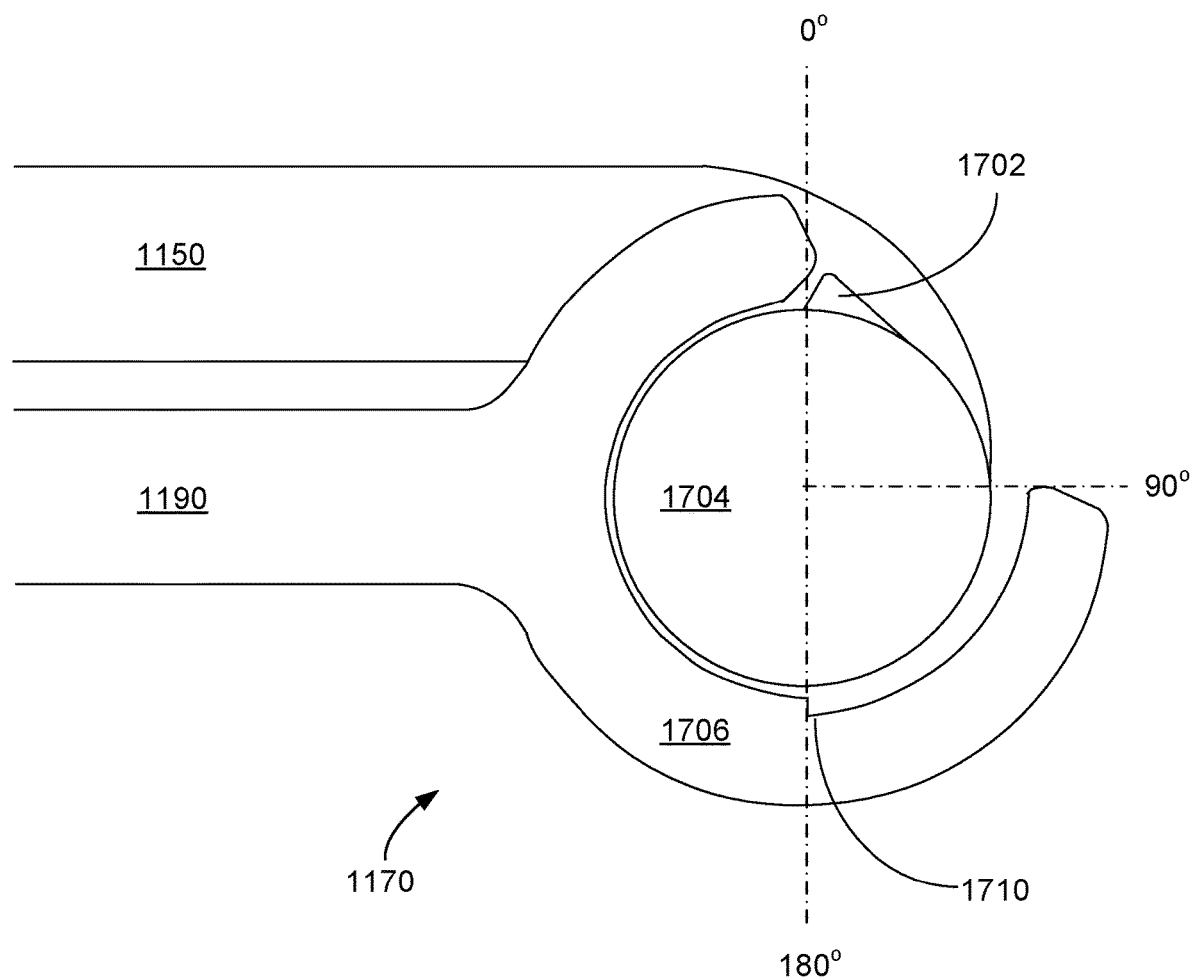
FIG. 18 is a cross-sectional view of a hinge of a filtering device.

For example, referring to FIGS. 17 and 18, a hinge assembly 1700 including example hinge 1170 is illustrated. The hinge 1170 includes a substantially cylindrical component 1704 (herein referred to as a "hinge core") that is attached to a main body of the access door 1150. In some implementations, the hinge core 1704 is formed with the access door 1150 as a single body, but in other implementations, the hinge core 1704 may be a separate component that is mounted (e.g., using a fastener or adhesive material) or welded to the access door 1150. The hinge 1170 further includes a receiving component 1706 attached to the base 1190 and configured to receive the hinge core 1704 (e.g., via a snap fit or interference fit). Upon receiving the hinge core 1704, the receiving component 1706 allows for rotation of the hinge core 1704 (and the access door 1150), along a longitudinal axis of the assembled hinge 1170. In some implementations, the receiving component 1706 is formed with the base 1190 as a single body, but in other implementations, the receiving component 1706 may be a separate component that is mounted (e.g., using a fastener or adhesive material) or welded to the base 1190. While the hinge core 1704 is shown as attached to the access door 1150, and the receiving component 1706 is shown as attached to the base 1190, in some implementations, the hinge core 1704 can be attached to the base 1190 and the receiving component 1706 can be attached to the access door 1150.

The hinge core 1704 includes a raised feature 1702 that serves as a hinge detent and can affect the amount of torque required to rotate the access door 1150 relative to the base 1190. The raised feature 1702 can extend along 20% to 100% of the length of the hinge core 1704 (e.g., 20%, 50%, 75%, 90%, 100% of the length of the hinge core 1704). FIG. 18 shows a cross-sectional view of the hinge 1170, providing a closer look at the interface between the hinge core 1704 and the receiving component 1706. FIG. 18 shows the access door 1150 in the closed position, where the angle of rotation of the hinge core 1704 (and access door 1150) is 0 degrees.

As shown in this view, the receiving component 1706 is shaped to allow for free rotation of the access door 1150 between the closed position (i.e., 0 degrees) and 180 degrees. For example, an inner diameter of the receiving component 1706 can be selected such that when the access door 1150 is rotated between 0 degrees and 180 degrees, there is a minimum clearance of 0.05 mm (e.g., 0.5 mm, 0.1 mm, 0.15 mm, etc.) between the raised feature 1702 and the inner face of the receiving component 1706. However, when the access door is rotated to 180 degrees, the raised feature 1702 comes into contact with a lip 1710 along the inner face of the receiving component 1706, where the inner diameter of the receiving component 1706 decreases. The decreased inner diameter of the receiving component can create interference with the raised feature 1702 ranging from 0.05 mm to 0.5 mm of interference (e.g., 0.05 mm, 0.1 mm, 0.35 mm, etc.). This increases the torque required to rotate the access door 1150 beyond 180 degrees (e.g., 181 degrees, 225 degrees, 270 degrees, etc.). For example, the amount of friction provided by the hinges 1170 when the access door is rotated beyond 180 degrees can be enough to counteract the force of gravity, or even greater forces, in order to hold the access door 1150 in the open position.

In some implementations, the lip 1710 of the receiving component 1706 does not extend along the full length of the hinge 1170, but only extends along a length of the raised feature 1702. Moreover, while a single raised feature 1702 is shown, in some implementations, the hinge core 1704 may include multiple raised features. The raised feature 1702 may also have various shapes. In some implementations, the receiving component 1706 can further include one or more notches along its inner face to catch the raised feature 1702 and hold open the access door 1150 at specific predefined angles of rotation (e.g., 225 degrees, 270 degrees, etc.).

Referring back to FIGS. 11A-11B, in some implementations, the interface assembly 1110 can include a latch mechanism 1160 for securing the access door 1150 in the closed position. The latch mechanism 1160 can be positioned on an opposite edge of the interface assembly 1110 as the hinges 1170. In some implementations, the latch mechanism 1160 can include a keeper disposed on the base 1190 and a latch disposed on the access door 1150. In other implementations, the keeper can be disposed on the access door 1150 while the latch is disposed on the base 1190. The latch can be made of rigid polymeric material, such as polypropylene, polycarbonate, acrylonitrile butadiene styrene, nylon, or another appropriate polymer, and it can have a length of 2 cm to 15 cm and a width of 1 cm to 3 cm. In some implementations, the latch can include a pin (e.g., a metal pin), which can serve as a hinge that enables the latch to rotate relative to the access door 1150 or relative to the base 1190. In some implementations, the latch mechanism 1160 can include one or more detents for securing the access door 1150 in the closed position. Altogether, the interface assembly 1110 (including the access door 1150, hinges 1170, latch mechanism 1160, and the base 1190) has a width between 9 cm and 16 cm; a length between 12 cm and 20 cm; and a depth of 5 mm to 80 mm when the access door 1150 is in the closed position.

Figure 12A:
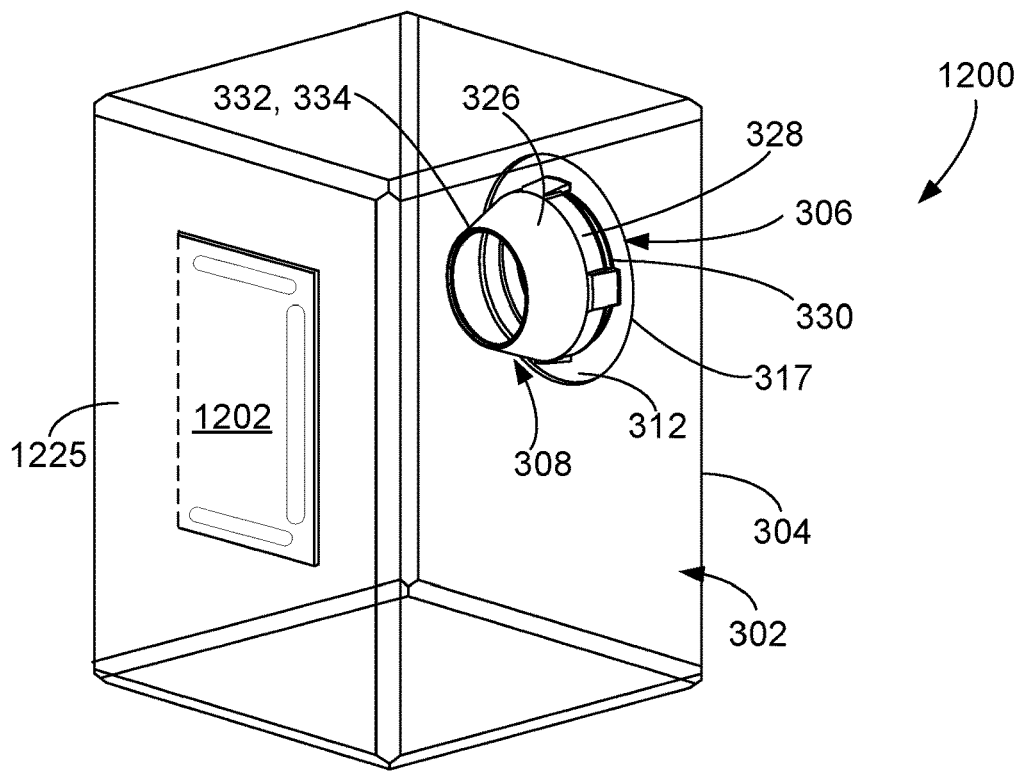
FIG. 12A is a side perspective view of a filtering device with a magnetic flap in a closed position.
Figure 12B:
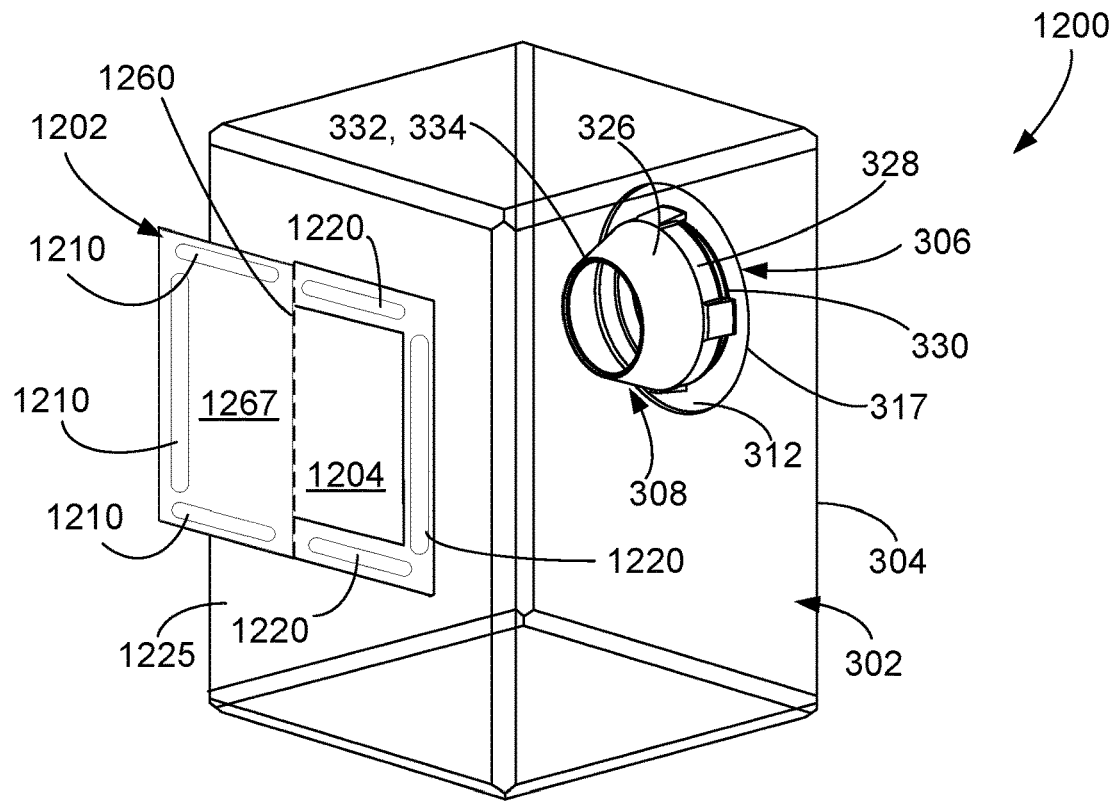
FIG. 12B is a side perspective view of a filtering device with a magnetic flap in an open position.

Referring to FIGS. 12A-12B, another implementation of a filtering device 1200 is illustrated from a side perspective view. As in FIG. 6, the filter bag 304 of the filtering device 1200 is shown as transparent. The filtering device 1200 has many similarities to the filtering device 300 (shown in FIGS. 5-6). For example, elements of the filtering device 1200 that can be similar to the filtering device 300 in some implementations are denoted by similar reference numerals.

The filtering device 1200 differs from the filtering device 300 in the manner in which the receptacle 302 of the filtering device 300 is accessible by a user. The filtering device 1200 includes a releasable magnetic flap 1202 for providing access to the space within the filter bag 304. FIG. 12A depicts the releasable magnetic flap 1202 in a closed, or unreleased, position while FIG. 12B depicts the releasable magnetic flap 1202 in an open, or released, position. In the open position, the magnetic flap 1202 provides access to the space within the filter bag 304 via an opening 1204. The opening 1204, in some implementations, has an area greater than the area of the inlet 306. In the closed position, the magnetic flap 1202 limits access to the space within the filter bag 304.

The magnetic flap 1202 is disposed on a rear surface 1225 of the filter bag 304, substantially opposite from a position of the interface assembly (including the inlet 306 and the conduit 308). The magnetic flap 1202 extends across only a portion of the rear surface 1255. For example, the width and the length of the magnetic flap 1202 can each be between 25% to 100% of the width and the length of the rear surface 1255 of the filter bag 304.

The magnetic flap 1202 includes one or more magnets 1210 that interact with magnetic material 1220 on the filter bag 304 to secure the magnetic flap 1202 in the unreleased position. The magnets are disposed along the perimeter of the magnetic flap 1202, between 0 cm and 5 cm from an edge of the magnetic flap (e.g., 1 cm away from the edge, 2 cm away from the edge, 3 cm away from the edge, etc.). The magnetic material 1220 is disposed in a corresponding position along a lip on the filter bag 304, surrounding the opening 1204. In other implementations, the magnets 1210 can be disposed on the filter bag 304, while the magnetic material 1220 is disposed on the magnetic flap 1202.

In the implementations represented in FIGS. 12A-12B, the magnets 1210 are disposed along a perimeter of the magnetic flap 1202. In particular, the magnets 1210 can be disposed along edges of the magnetic flap 1202 that are movable away from the filter bag 304. For example, in the example of FIGS. 12A-12B in which the opening 1204 is rectangular, the magnets 1210 are disposed along three edges of the magnetic flap 1202 that are movable away from the filter bag 304.

The interaction between the magnets 1210 and the magnetic material 1220 provides a seal that prevents escape of debris from the filter bag 304 when the magnetic flap 1202 is in the unreleased position. The combined strength of the magnets 1210 is sufficient to maintain the magnetic flap 1202 in the unreleased position when a flow of air is generated by the evacuation station 100 (e.g., by air mover 117) so that the magnetic flap 1202 is not blown open into the released position. In some implementations, the magnetic flap 1202 can include an elastomeric or rubber seal (e.g., elastomeric or rubber material disposed along a perimeter of the magnetic flap 1202) to prevent pneumatic bypass around the edges of the magnetic flap 1202 when a flow of air is generated by the evacuation station 100. In such implementations, the combined strength of the magnets 1210 can be sufficient to compress the elastomeric or rubber material to create an substantially airtight seal when the magnetic flap 1202 is in the unreleased position.

In the closed position, the magnetic flap 1202 at least partially defines the receptacle 302 of the filter bag 304. In particular, an internal surface 1267 of the magnetic flap 1202 can at least partially define the receptacle 302 of the filter bag 304. In this regard, in the closed position of the magnetic flap 1202, surfaces of the filter bag 304 in combination with the magnetic flap 1202 can define the receptacle 302 of the filter bag 304.

To release the magnetic flap 1202 from the filter bag 304, the magnetic flap 1202 can be pulled away from the rear surface 1225 of the filter bag 304. At least part of the magnetic flap 1202 is moved away from the opening 1204 and from the rear surface 1225 of the filter bag 304. This part of the magnetic flap 1202 is moved away while another part of the magnetic flap 1202 remains attached to the filter bag 304, e.g., via a fold line 1260. The magnetic flap 1202 is connected to the filter bag 304 at the fold line 1260. To move the part of the magnetic flap 1202 away from the opening 1204, the magnetic flap 1202 is rotated about the fold line 1260. In some implementations, in the closed position of the magnetic flap 1202, the internal surface 1267 of the magnetic flap 1202 contacts the filter bag 304, while in the open position of the magnetic flap 1202, this internal facing surface does not contact the filter bag 304.

While the releasable magnetic flap 1202 is depicted as having a substantially rectangular shape, in other implementations, the magnetic flap 1202 is circular or has a polygonal shape. In addition, while the magnetic flap 1202 is depicted as being attached to the filter bag 304 along one edge (e.g., sewn or adhered along one edge), in other implementations the magnetic flap 1202 could be entirely removable from the filter bag 304.

In some implementations, the magnetic flap 1202 is formed of a material distinct from the material forming the filter bag 304. The magnetic flap 1202 can be attached to the filter bag 304 via stitches, via adhesives, via welding, or via other attachment mechanisms. In some implementations, the magnetic flap 1202 is integral to the filter bag 304. For example, the magnetic flap 1202 can be formed from making incisions in the material of the filter bag 304, e.g., at least three cuts to form a rectangular opening 1204. The magnetic flap 1202 is foldable along the edge attaching the magnetic flap 1202 to the filter bag 304. A base can be attached to the filter bag 304 to provide the magnetic flap 1202 a substrate for the portion of the magnetic flap 1202 containing the magnets to attach to. For example, instead of attaching to the lip of the filter bag 304, the magnetic flap 1202 magnetically connects to the base that is in turn attached to the filter bag 304.

In other implementations, the magnetic flap 1202 can be positioned on a side surface of the filter bag 304, or a bottom surface of the filter bag 304. In some implementations, the magnetic material 1220 is on a component distinct from the filter bag 304. For example, the filtering device 1200 can include a base (e.g., similar to the base 1190 in the implementations represented in FIGS. 11A-11B) that is attached to the filter bag 304, and the base can include magnetic material that can engage with the magnetic flap 1202.

In some implementations, the implementations represented in FIGS. 11A-11B can be modified to include magnets and magnetic material such that the access door 1150 and the base 1190 can be connected to one another. For example, one of the access door 1150 or the base 1190 can include one or more magnets, and the other of the access door 1150 or the base 1190 can include magnetic material. The access door 1150 and the base 1190 are magnetically connected to one another in the closed position of the access door. The one or more magnets and the magnetic material can be substituted for the latch mechanism 1160.

Referring to FIG. 13, another implementation of a filtering device 1300 is illustrated. The filtering device 1300 has many similarities to the filtering device 300 (shown in FIGS. 5-6). For example, elements of the filtering device 1300 that can be similar to the filtering device 300 in some implementations are denoted by similar reference numerals.

The filtering device 1300 differs from the filtering device 300 in the manner in which the receptacle 302 of the filtering device 300 is accessible by a user. The filtering device 1300 includes a slider mechanism including a movable component 1302 and a stationary component 1304. The slider mechanism is used to seal together two edges of the filter bag 304 that, when separated, provide access to the space within the filter bag 304. By sliding the movable component upward (as indicated by the directional arrow U in FIG. 13), the seal provided by the slider mechanism can be undone to provide a user access to the space within the filter bag 304 (e.g., in order to remove debris). By sliding the movable component downward, the filter bag 304 can be resealed. The strength of the seal provided by the slider mechanism is at least sufficient to withstand a flow of air generated by the evacuation station 100 (e.g., by air mover 117). In some implementations, an elastomeric material or rubber material can be used at the interface of the two edges of the filter bag 304 to ensure that the seal is substantially airtight.

The movable component 1302 can be elongate member extending along an edge of the filter bag 304. The movable component 1302 can be formed of metal, wood, or a rigid polymeric material, such as polypropylene, polycarbonate, acrylonitrile butadiene styrene, nylon, or another appropriate polymer. The stationary component 1304 can be formed of a similar metal, a similar wood, a similar rigid polymeric material, or another rigid material discussed in this disclosure.

In some implementations the movable component 1302 of the slider mechanism can include a longitudinal-extending opening 1306 to receive two edges of the filter bag 304. In particular the two edges of the filter bag 304 can be squeezed together within the opening 1306, thereby creating a seal between the two edges of the filter bag 304. In this regard, the movable component 1302, when positioned over the two edges of the filter bag 304, can provide a seal with a length of at least 90% of a height of the filter bag 304. The movable component 1302 can have a length substantially similar to a height of the filter bag 304. For example, the length of movable component 1302 can be between 80% and 130% of the height of the filter bag 304. The movable component 1302 is movable between an engaged position and a disengaged position. The movable component 1302, in some implementations, abuts the stationary component 1304 in the engaged position. In the disengaged position, the movable component 1302 does not abut the stationary component 1304.

In some implementations, the movable component 1302 of the slider mechanism can act as a pin, which can secure two edges of the filter bag 304 by being inserted into loops disposed along the two edges. For example, a plurality of loops (e.g., made of paper; fabric; composite fiber; spunbound, nonwoven, or melt blown material; plastic; etc.) can be disposed along each of the two edges of the filter bag 304 such that when the two edges are brought together, the loops are aligned. The movable component 1302 can then be inserted into the loops of each edge to secure the two edges of the filter bag 304 together. In some implementations, the spacing of the loops along each edge can be designed such that the movable component 1302 is alternately inserted into a loop disposed on one edge of the filter bag 304 followed by a loop disposed on the other edge of the filter bag 304. In this regard, the movable component 1302, when inserted through the loops, can provide a seal between the two edges of the filter bag 304 with a length of at least 90% of a height of the filter bag 304. The movable component 1302 can have a length substantially similar to a height of the filter bag 304. For example, the length of movable component 1302 can be between 80% and 130% of the height of the filter bag 304. The movable component 1302 is movable between an engaged position and a disengaged position. The movable component 1302, in some implementations, abuts the stationary component 1304 in the engaged position. In the disengaged position, the movable component 1302 does not abut the stationary component 1304.

The stationary component 1304 is fixed to the filter bag 304. For example, the stationary component 1304 can be welded or stitched to a corner of the filter bag 304, e.g., a region where three edges of the filter bag 304 meet. The stationary component 1304 and the movable component 1302 are configured to mate with one another when the movable component 1302 is in the engaged position. For example, the stationary component 1304 can include a contact surface that abuts a contact surface of the movable component 1302.

In some implementations, the slider mechanism is disposed on a rear-facing surface of the filter bag 304, substantially opposite the interface assembly 310. In other implementations, the slider mechanism can be positioned near the front surface of the filter bag 304, in close proximity to the interface assembly 310.

In some implementations, the stationary component 1304 of the slider mechanism can be ergonomically shaped, or may include a loop (not shown), to allow the user to comfortably hold onto while sliding the movable component 1302 to unseal or seal the filter bag 304. In some implementations, the movable component 1302 can be attached to the filter bag 304 (e.g., tied at one end to the filter bag) so that when the filter bag 304 is completely unsealed, the movable component is not misplaced or lost. In other implementations, the movable component 1302 of the slider mechanism is entirely removable from the filter bag 304.

Referring to FIG. 14, another implementation of a filtering device 1400 is illustrated. As in FIG. 6 and FIG. 12, the filter bag 304 of the filtering device 1400 is shown as transparent. The filtering device 1400 has many similarities to the filtering device 300 (shown in FIGS. 5-6), and similar elements are denoted by similar reference numerals. However, the filtering device 1400 includes a zipper 1402 to seal together two edges of the filter bag 304 that, when separated, provide access to the space within the filter bag 304. The zipper 1402 can be operated using a handle 1404. By translating the handle 1404 along the zipper 1402, the zipper 1402 can be zipped and unzipped. The strength of the seal provided by the zipper 1402 is at least sufficient to withstand a flow of air generated by the evacuation station 100 (e.g., by air mover 117).

In some implementations, the zipper is disposed on a rear-facing surface of the filter bag 304, substantially opposite the interface assembly 310. In other implementations, the zipper 1402 can be positioned near the front surface of the filter bag 304, in close proximity to the interface assembly 310.

In some implementations, the zipper 1402 can have an L-shape, so that when it is unzipped, a flap of the filter bag 304 can be pulled back to provide easy access to the space within the filter bag 304 (e.g., in order to remove debris). In other implementations, the zipper 1402 can have different shapes. For example, the zipper can a single line or can be substantially U-shaped. While a zipper 1402 has been described, in some implementations, hook-and-loop fasteners, 3M™ Dual Lock™ fasteners, or other fastening systems may be used in lieu of the zipper 1402.FIG. 15 illustrates an example process 400 executed by the controller 113 of the evacuation station 100. After the robot 200 has docked at the evacuation station 100, the controller 113 at operation 402 initiates an evacuation process. During the evacuation process, the controller 113 activates the air mover 117, thereby generating the airflow to evacuate debris from the debris bin 204 of the robot 200.

Figure 15A:
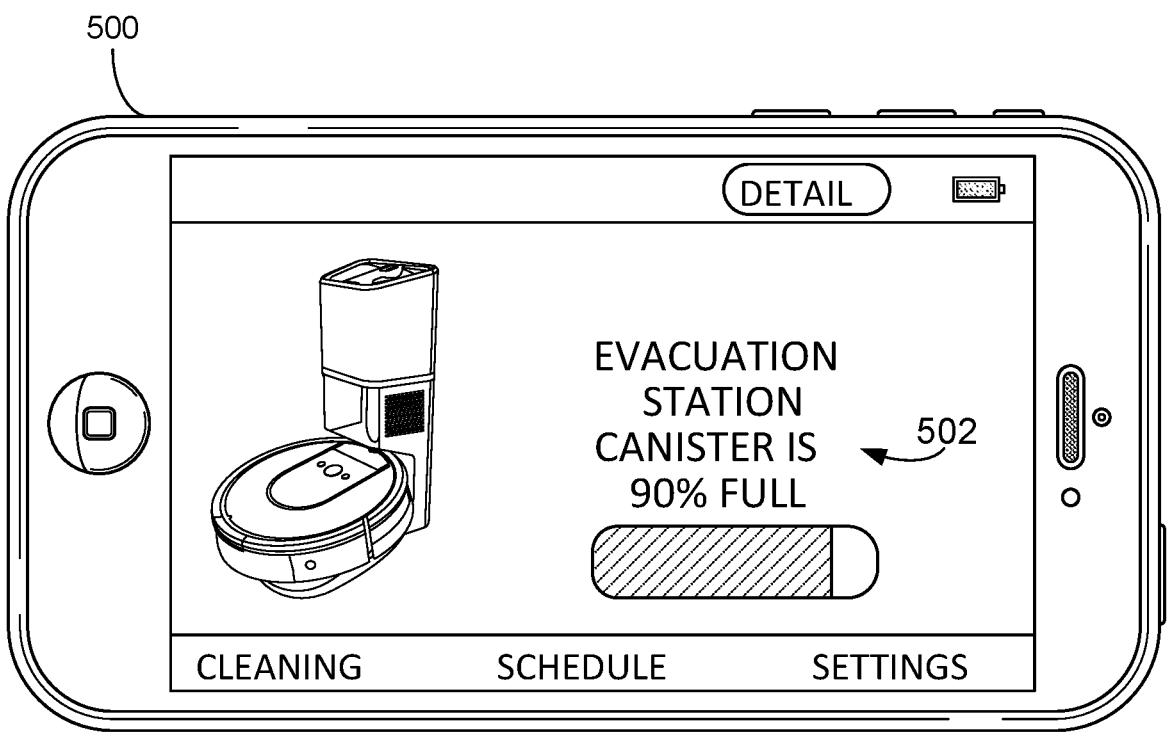
FIGS. 15A-15C are front views of remote computing devices presenting user notifications.

In some implementations, the sensor 126 (shown in FIG. 1) can be a pressure sensor that generates one or more signals indicative of a steady-state pressure within the receptacle 130 of the evacuation station 100. During the evacuation process, referring to FIG. 15A, the controller 113 can transmit data indicative of the steady-state pressure to a remote computing device 500, e.g., a smartphone, a personal computer, a smartwatch, smartglasses, augmented reality device, or other remote computing device. For example, the controller 113 can directly transmit the data to the remote computing device 500, e.g., via a Bluetooth, LAN, or other appropriate wireless communication protocol, or the controller 113 can transmit the data to the remote computing device 500 via a remote server. As shown in FIG. 15A, the steady-state pressure can be indicative of a fullness state of the evacuation station 100. Based on the steady-state pressure, the remote computing device 500 can present a notification 502 indicative of the fullness state of the evacuation station 100. For example, the notification 502 can indicate a percentage of the total debris capacity of the filtering device 300 occupied by accumulated debris.

Figure 15B:
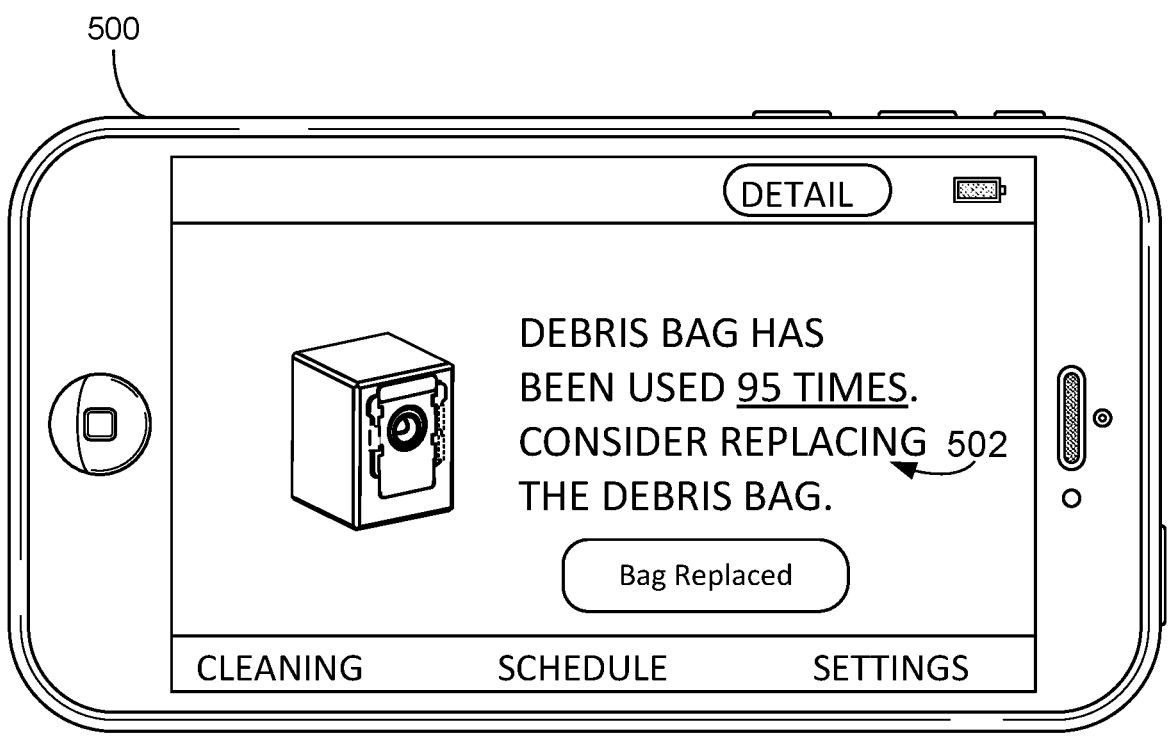

In some implementations, referring to FIG. 15B, the controller 113 can transmit information indicative of a number of uses of a particular filtering device. For example, in implementations in which the filtering device is a reusable filtering device, the controller 113 can track the number of evacuation operations that the filtering device has been used for. As shown in FIG. 15B, the remote computing device 500 can provide a notification 504 of the number of uses of the filtering device. If the number of uses of the filtering device exceeds a threshold number, e.g., between 25 and 100, between 100 and 200, between 200 and 300, between 300 and 400, etc., the remote computing device 500 can provide a recommendation to the user to replace the filtering device. In some implementations, rather than tracking a number of evacuation operations, the controller 113 can track the number of times that the filtering device has been removed and emptied. The controller 113 can transmit this information to the remote computing device 500, and the remote computing device 500 can provide a notification of a number of times that the filtering device has been emptied. In some implementations, the user can operate the remote computing device 500 to reset the tracked number of uses or the tracked number of emptying operations, e.g., when the user replaces the filtering device with a new filtering device.

Figure 15C:
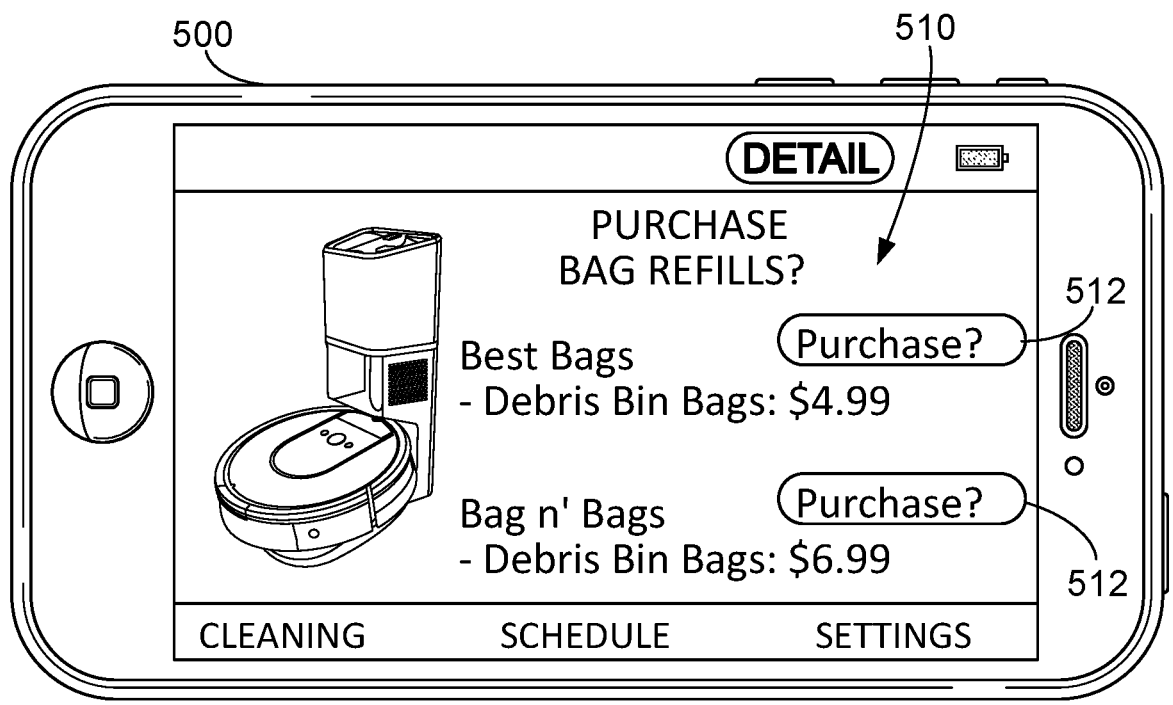

In some examples, referring to FIG. 15C, the controller 113 additionally or alternatively can present a notification 510 indicating that the user should order one or more additional filtering devices. The notification 510 can include user interface elements 512 enabling the user to directly order a filtering device to be delivered to the user's home.

Figure 16:
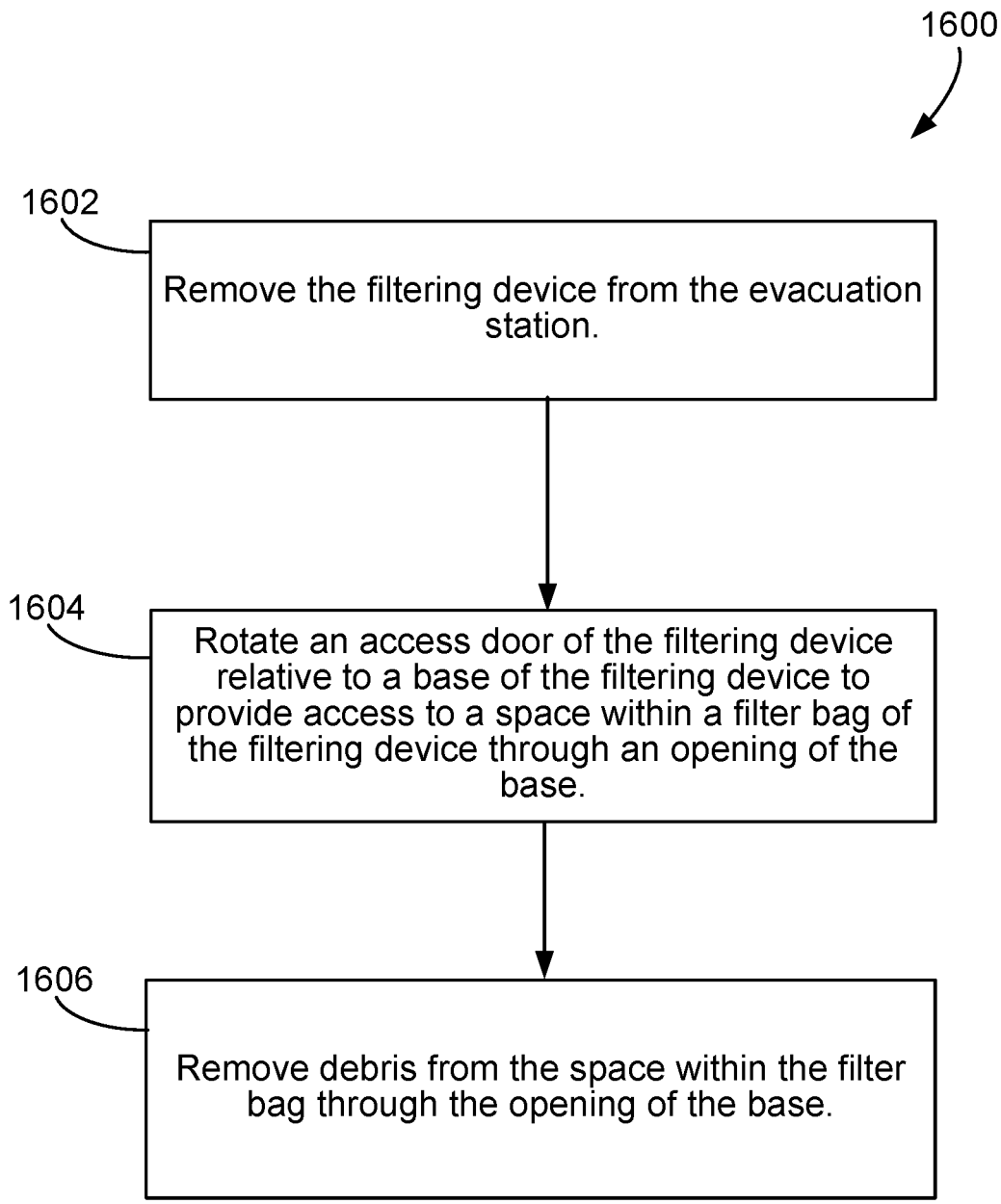
FIG. 16 is a flow chart illustrating a process for emptying a filtering device.

FIG. 16 illustrates an example process 1600 executed by a user to empty a filtering device (e.g., filtering device 1100) of the evacuation station 100. In some implementations, the user may first operate the evacuation station 100 to evacuate debris from the cleaning robot 200 and collect debris within the filtering device 1100. At operation 1602, the user removes the filtering device from the evacuation station. This can be done by disconnecting filtering device 1100 from one or more conduits of the evacuation station 100 and then removing it from the receptacle 130, as described above in relation to FIG. 4. This can also include disengaging the inlet 306 of the filtering device 1100 from an outlet of the evacuation station 100. In some implementations, the user may move the cover 314 of the filtering device (e.g., by sliding the cover 314) to block the inlet 306, so that no debris spills out of the filtering device 1100 as it is removed from the evacuation station 100.

In some implementations, the user receives a notification that the filtering device is in a full state or clogged state (as described in relation to FIGS. 16A-F), which can prompt the user to remove the filtering device from the evacuation station. Determining the full state or clogged state of the filtering device can be based on one or more signals generated by a sensor positioned proximate an airflow pathway through the evacuation station (e.g., sensor 126).

At operation 1604, the user rotates an access door of the filtering device relative to a base of the filtering device to provide access to a space within a filter bag of the filtering device through an opening of the base. For example, the filtering device can be the filtering device 1100 described in relation to FIGS. 11A-11B. The access door can be the access door 1150 and the base can be the base 1190. Rotating the access door 1150 can include rotating the access door 1150 about the hinges 1170 from the closed position to the open position. In some implementations, prior to rotating the access door 1150, the user must release a latch mechanism (e.g., latch mechanism 1160) that secures the access door 1150 in the closed position.

At operation 1606, the user removes debris from the space within the filter bag through the opening of the base. For example, the user can remove the debris that has been collected within the filter bag 304 through the opening 1180 of the base 1190. Subsequent to removing the debris from the space within the filter bag 304, the user can rotate the access door 1150 back to a closed position and reinsert the filtering device 1100 into the evacuation station 100, thereby preparing the filtering device 1100 to be reused. Prior to reinsertion of the filtering device 1100, the user may also engage a latch mechanism 1160 to secure the access door 1150 in the closed position.

A number of implementations have been described. Nevertheless, it will be understood that various modifications may be made.

The robots and evacuation stations described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations and processes associated with controlling the robots and evacuation stations described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots and the evacuation stations described herein can be implemented using special purpose logic circuitry, e.g., an FPGA (field programmable gate array) and/or an ASIC (application-specific integrated circuit).

The controllers (e.g., the controller 113, the controller 206) described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks. While the controller 113 of the evacuation station 100 is described as controlling the air mover 115 and performing other operations as described herein, in other implementations, the controller 206 of the robot 200, a remote server, or a combination of various controllers described herein can be used to control the operations of the evacuation station 100.

While the conduit 308 is described as being formed from a rigid polymer, in some implementations, the conduit 308 is formed from a flexible material. The conduit 308 can be a thin piece of polymeric material. The conduit 308 can formed from, for example, polyurethane, latex, rubber, an elastomer, another appropriate flexible material, or a combination of multiple appropriate materials that provide flexibility. The conduit 308 can be sufficiently flexible such that the conduit 308 droops when the air mover 115 of the evacuation station 100 is not operated. During operation of the air mover 115, the conduit 308 can expand to allow the airflow generated by the air mover 115 to pass through the conduit 308.

While the sensor 126 is described, in some implementations, the evacuation station 100 includes multiple sensors positioned along or proximate the airflow pathways of the evacuation station 100. For example, the evacuation station 100 can include two pressure sensors, with one pressure sensor located on opposing sides of an airflow pathway. In some implementations, a first pressure sensor can be located within the canister, such as near the filtering device 300, and a second pressure sensor can be located near the intake 118 of the evacuation station 100. Based on signals from the multiple sensors, the controller 113 can determine a particular location along the airflow pathways of a clog or other obstruction or an air leak.

While the filtering device 300 is described as a bag-based filtering device including the filter bag 304, in other implementations, the filtering device 300 includes a rigid container to which the collar 312 is attached. In some implementations, the filtering device 300 is a reusable container that can be emptied by a user and, in some cases, be cleaned for subsequent reuse with an evacuation station.

The cover 314 is described in some implementations as being slidable relative to the collar 312. In some cases, as described herein, the cover 314 is translatable relative to the collar 312. Additionally or alternatively, the cover 314 is rotatable relative to the cover 314 between the open and closed positions. In some implementations, the seal 316 serves as a cover for the opening 317 of the filter bag 304. For example, the seal 316 can cover substantially an entirety of the opening 317 of the filter bag 304, e.g., 75% to 95%. The conduit 114 in the protruded position can be penetrate the seal 316 and thereby enlarge the opening 338 defined by the seal 316. The seal 316 can include several slits that impart the flexibility for allowing the conduit 114 to penetrate the seal 316.

While the snap fit mechanism 324 is described as attaching the conduit 308 to the collar 312, in other implementations, a mechanism for attaching the conduit 308 to the collar 312 includes adhesive attachment, welding, an interference fit mechanism, or other appropriate attachment mechanism.

Accordingly, other implementations are within the scope of the claims.

What is claimed is:

1. A filtering device comprising:
 a filter bag configured to collect debris evacuated from a cleaning robot by an evacuation station; and
 an interface assembly configured to interface with the evacuation station, the interface assembly comprising:
  a base attached to the filter bag along an opening of the filter bag, an opening of the base aligned with the opening of the filter bag;
  an access door; and
  one or more hinges connecting the base and the access door,
   wherein the access door is rotatable about the one or more hinges from a closed position to an open position, and
   wherein the one or more hinges each comprises (i) a hinge core having one or more protrusions and (ii) a receiving component that at least partially surrounds the hinge core, the receiving component comprising one or more notches configured to catch the one or more protrusions of the hinge core at one or more angles of rotation of the access door.

2. The filtering device of claim 1, wherein the access door is configured to (i) provide access to a space within the filter bag via the opening of the base when the access door is in the open position and (ii) limit access to the space within the filter bag via the opening of the base when the access door is in the closed position.

3. The filtering device of claim 1, wherein the access door comprises an inlet configured to interface with an outlet of the evacuation station to pneumatically connect a space within the filter bag with the outlet of the evacuation station.

4. The filtering device of claim 3, wherein the access door further comprises a conduit, wherein an opening of the conduit is aligned with the inlet and wherein the conduit extends into the space within the filter bag when the access door is in the closed position.

5. The filtering device of claim 3, wherein the access door further comprises:
 a slider comprising an opening, the slider configured to move between a first position and a second position, wherein the opening of the slider is aligned with the inlet in the first position and wherein the opening of the slider is misaligned with the inlet in the second position.

6. The filtering device of claim 3, wherein an area of the opening of the base is greater than an area of the inlet.

7. The filtering device of claim 1, wherein a substantially airtight seal is formed along one or more edges of the interface assembly when the access door is in the closed position.

8. The filtering device of claim 7, wherein the substantially airtight seal is formed between the base and the access door.

9. The filtering device of claim 1, wherein the one or more hinges are disposed on a lateral edge of the interface assembly.

10. The filtering device of claim 1, wherein the interface assembly further comprises a latch mechanism configured to secure the access door in the closed position.

11. The filtering device of claim 10, wherein the one or more hinges are disposed on a first lateral edge of the interface assembly, and wherein the latch mechanism is disposed on a second lateral edge of the interface assembly, the second lateral edge being opposite the first lateral edge.

12. The filtering device of claim 10, wherein the latch mechanism comprises:
 a keeper disposed on the base of the interface assembly and a latch disposed on the access door.

13. The filtering device of claim 12, wherein the latch has a length of 2 cm to 15 cm and a width of 1 cm to 3 cm.

14. The filtering device of claim 10, wherein the latch mechanism comprises one or more detents.

15. The filtering device of claim 1, wherein a front of the base comprises one or more ribbed features.

16. The filtering device of claim 1, wherein the interface assembly has a length of 12 cm to 20 cm.

17. The filtering device of claim 16, wherein the interface assembly has a width of 9 cm to 16 cm, and a depth of 5 mm to 80 mm.

18. The filtering device of claim 1, wherein the base is attached to the filter bag using at least one of an adhesive attachment, a welding, or an interference fit.

19. The filtering device of claim 1, wherein a first amount of torque required to rotate the access door relative to the base from the closed position to an intermediate position is less than a second amount of torque required to rotate the access door beyond the intermediate position.

20. The filtering device of claim 19, wherein the intermediate position corresponds to the access door being rotated about 180 degrees from the closed position.

21. The filtering device of claim 19, wherein an amount of friction provided by the one or more hinges when the access door is rotated beyond the intermediate position is sufficient to counteract a force of gravity.

22. The filtering device of claim 1, wherein the base comprises a planar surface that is parallel to a surface of the filter bag, and wherein the access door comes in contact with the planar surface in the closed position.

* * * * *